US011768334B2

(12) United States Patent
Miller et al.

(10) Patent No.: US 11,768,334 B2
(45) Date of Patent: Sep. 26, 2023

(54) LENSED OPTICAL FIBER CONNECTOR WITH DUST INSENSITIVE ALIGNMENT FEATURES

(71) Applicant: CORNING RESEARCH & DEVELOPMENT CORPORATION, Corning, NY (US)

(72) Inventors: William James Miller, Horseheads, NY (US); James Scott Sutherland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/357,661

(22) Filed: Jun. 24, 2021

(65) Prior Publication Data
US 2022/0413228 A1    Dec. 29, 2022

(51) Int. Cl.
*G02B 6/38* (2006.01)

(52) U.S. Cl.
CPC ......... *G02B 6/3853* (2013.01); *G02B 6/3847* (2013.01); *G02B 6/3851* (2013.01); *G02B 6/3882* (2013.01); *G02B 6/3885* (2013.01)

(58) Field of Classification Search
CPC .. G02B 6/3847; G02B 6/3851; G02B 6/3853; G02B 6/3882
See application file for complete search history.

(56) References Cited

U.S. PATENT DOCUMENTS

| 6,095,697 A * | 8/2000 | Lehman ................. G02B 6/423 385/91 |
| 6,520,686 B1 * | 2/2003 | Kiani ................... G02B 6/3883 439/378 |
| 7,480,432 B2 | 1/2009 | Grzybowski et al. |
| 7,991,252 B2 | 8/2011 | Cheng et al. |
| 8,291,729 B2 | 10/2012 | Grzybowski et al. |
| 8,397,537 B2 | 3/2013 | Grzybowski et al. |
| 8,824,840 B2 * | 9/2014 | Hsu ...................... G02B 6/3885 385/74 |
| 9,726,826 B2 * | 8/2017 | Ooi ...................... G02B 6/4249 |
| 9,739,948 B2 | 8/2017 | Watanabe et al. |
| 10,197,743 B2 * | 2/2019 | Childers ............. G02B 6/3853 |
| 10,353,157 B2 * | 7/2019 | Fortusini ................. G02B 6/43 |
| 2004/0120654 A1 * | 6/2004 | Kevern ................. G02B 6/3885 385/78 |
| 2014/0270651 A1 | 9/2014 | Kadar-Kallen et al. |
| 2015/0104135 A1 | 4/2015 | Bushnell et al. |
| 2016/0041344 A1 | 2/2016 | Wasserbauer |
| 2018/0314012 A1 | 11/2018 | Gsell et al. |

FOREIGN PATENT DOCUMENTS

| CN | 102436040 A | 5/2012 |
| CN | 109425939 A | 3/2019 |
| GB | 2408350 A | 5/2005 |
| JP | 4321002 B2 | 8/2009 |
| JP | 2020071360 A * | 5/2020 |
| WO | 2018/022319 A1 | 2/2018 |
| WO | 2021/091949 A1 | 5/2021 |

* cited by examiner

*Primary Examiner* — Ryan A Lepisto

(57) ABSTRACT

The present disclosure relates to lensed optical fiber connector ferrule end faces having molded contact surfaces. The contact surfaces reduce ferrule end face contact area and thereby reduce the influence of trapped dust and debris on lens angular misalignment.

11 Claims, 20 Drawing Sheets

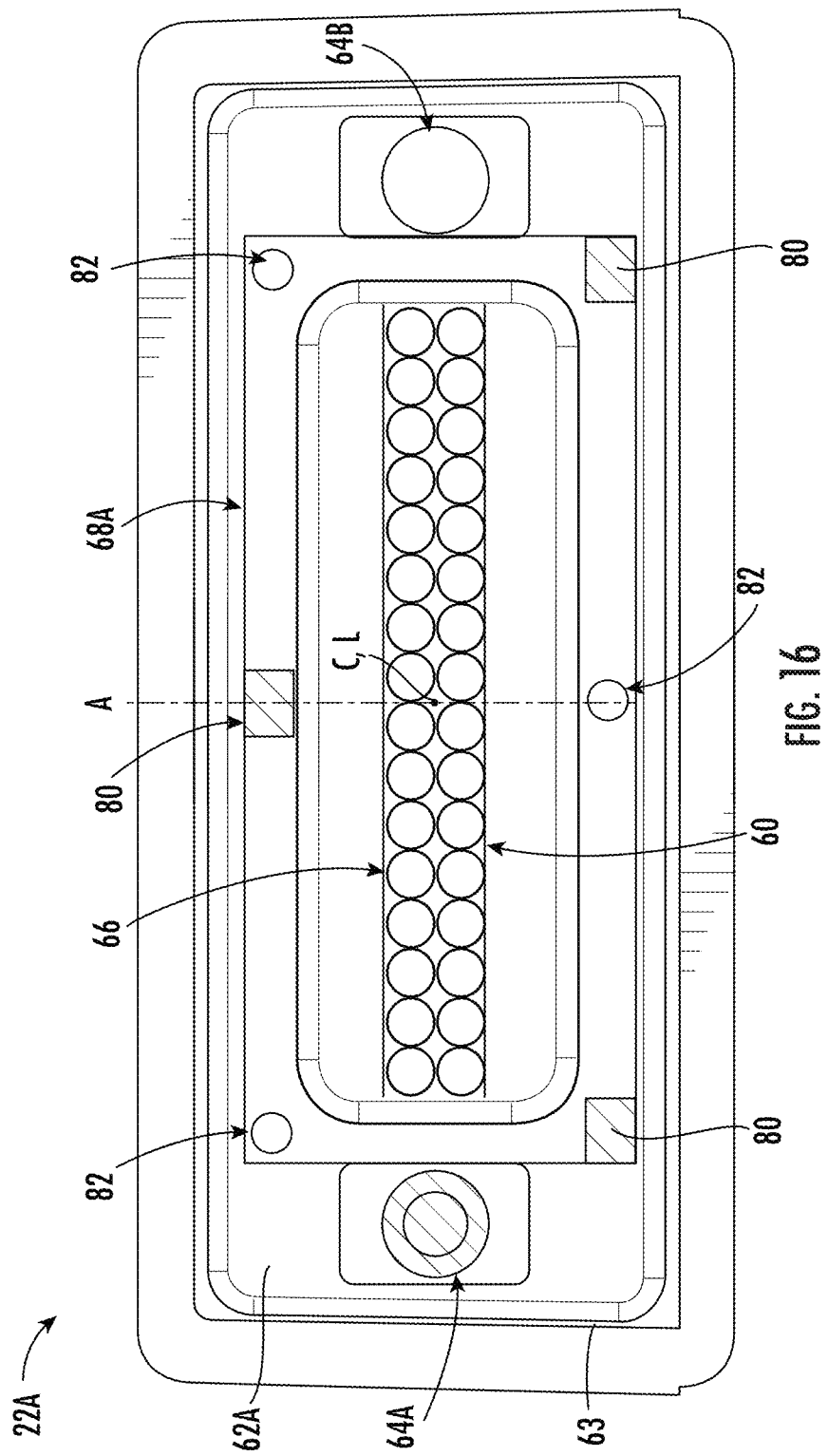

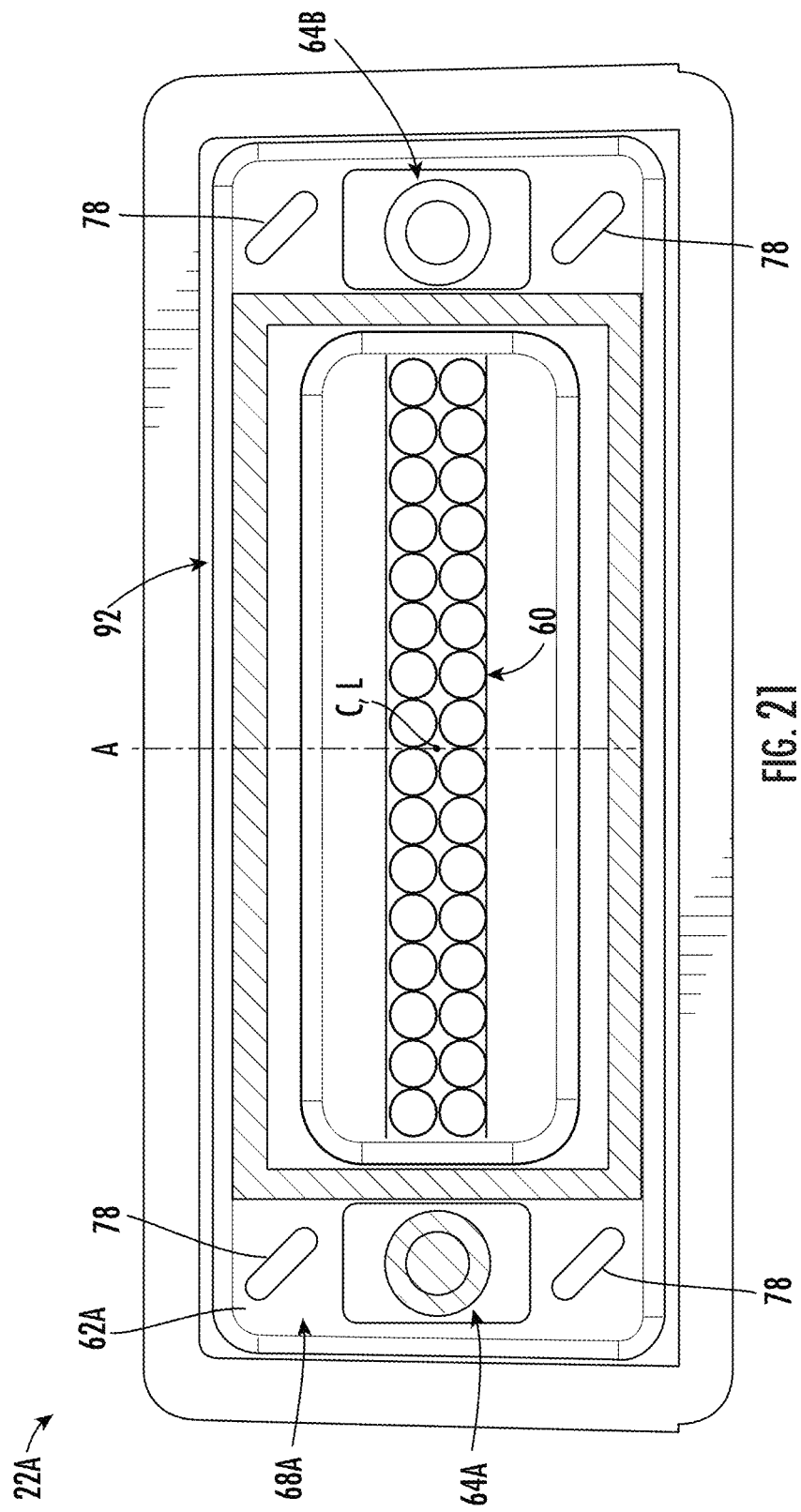

//‍ # LENSED OPTICAL FIBER CONNECTOR WITH DUST INSENSITIVE ALIGNMENT FEATURES

FIELD OF THE DISCLOSURE

This disclosure relates to expanded beam or lensed optical fiber connectors that are suitable for use in dusty environments and more particularly, to lensed optical fiber connector ferrule end face configurations that reduce dust sensitivity.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Lensed optical fiber connectors can be used in environments with dust and debris present because the lensed optical fiber connectors can provide sufficient area for low loss transmission even when their large coupling beams are partially blocked by dust particles. For example, an expanded beam from a lensed optical fiber connector can range between 60 µm and 120 µm in diameter, while typical dust particles may range between 0.5 µm and 10 µm in diameter.

When connected, mated lensed optical fiber connector ferrules typically contact at precision flat surfaces molded into their respective end faces. If the flat surfaces are large, there is a high probability that during lensed optical fiber connector ferrule mating, a particle(s) of dust or debris will become trapped between mating flat surfaces. Depending on the size and composition of the trapped dust or debris particle(s), the presence of a trapped dust particle(s) can cause the lensed optical fiber connector ferrule end faces to become slightly angled with respect to each other resulting in an increase in coupling loss. Referring to FIG. 1, a simulation of coupling losses for lensed optical fiber connectors emitting different sized beams with varying angular offsets are plotted. As shown, 30 µm diameter beams and 50 µm diameter beams are plotted, and the simulations show that even small angular offsets, such as 0.1 degrees, can introduce large insertion losses.

While FIG. 1 considers angular misalignment in one axis, angular misalignment contribution from dust particles can be multidirectional (e.g., $\theta_X$ and $\theta_Y$ components). This analysis shows that the interface between lensed optical fiber connector ferrule end faces is highly sensitive to dust particles.

Accordingly, improvements in the foregoing are desired where lensed connector ferrule end faces are tolerant of dust and debris trapped in contact surfaces during lensed connector ferrule mating.

SUMMARY OF THE DISCLOSURE

The present disclosure relates to lensed optical fiber connector ferrule end faces (hereinafter referred to as "connector ferrule end faces" or "ferrule end faces") having molded contact surfaces. The contact surfaces reduce ferrule end face contact area and thereby reduce the influence of trapped dust and debris on lens angular misalignment.

In one embodiment, a lensed connector is provided. The lensed connector comprising: a first lensed connector ferrule comprising a first ferrule end face; wherein the first lensed connector ferrule has a first contact surface comprising a portion of a first surface area of the first ferrule end face, the first contact surface comprising between 1% and 50% of the first surface area.

In another embodiment, the first contact surface comprises at least one raised surface integrally formed with the first ferrule end face. In another embodiment, the first contact surface comprises a first contact ring and a second contact ring spaced from the first contact ring. In another embodiment, the first contact surface comprises a contact ring, wherein the contact ring includes a plurality of raised surfaces, wherein the plurality of raised surfaces are elevated relative to the first contact surface, the plurality of raised surfaces are spaced apart such that a plurality of trenches are between the plurality of ridges. In another embodiment, the first contact surface comprises a plurality of ridges that are elevated relative to the first contact surface and angled relative to a plane defined by a central axis of the first lensed connector ferrule, wherein the plurality of ridges are parallel to each other. In another embodiment, the first ferrule end face comprises a plurality of lens apertures, and wherein the first contact surface further comprises a gasket proximal to a plurality of lens apertures. In another embodiment, the first ferrule end face comprises a plurality of lens apertures, and wherein the first contact surface further comprises a ridge-trench ring that surrounds the plurality of lens apertures; wherein the ridge-trench ring includes a ridge adjacent to a trench, and wherein each of the ridge and the trench span half of a perimeter of the ridge trench ring. In another embodiment, wherein the ridge-trench ring further comprises a first ridge-trench ring and a second ridge-trench ring surrounding the first ridge-trench ring, wherein the first ridge-trench ring and the second ridge-trench ring are proximal to the plurality of lens apertures of the first ferrule end face; wherein the first ridge-trench ring and the second ridge-trench ring are concentric and surround the plurality of lens apertures. In another embodiment, a ridge portion of the first ridge-trench ring is adjacent to a trench portion of the second ridge-trench ring, and a trench portion of the first ridge-trench ring is adjacent to a ridge portion of the second ridge-trench ring. In another embodiment, the first contact surface comprises a contact ring, wherein the contact ring includes a plurality of raised bumps along the contact ring. In another embodiment, each of the plurality of raised bumps is circular in shape and have an apex height relative to the first contact surface of between 10 µm and 1 mm. In another embodiment, each of the plurality of raised bumps is quadrilateral in shape and have an apex height relative to the first contact surface of between 10 µm and 1 mm. In another embodiment, the contact surface comprises a glass sheet with an aperture and a plurality of raised bumps positioned around a perimeter of the aperture. In another embodiment, the glass sheet covers between 55% and 100% of the first surface area of the first ferrule end face. In another embodiment, the lensed connector further comprises a second lensed connector ferrule coupled to the first lensed connector ferrule, the second lensed connector ferrule having a second ferrule end face; wherein the second lensed connector ferrule has a second contact surface comprising between 1% and 50% of a second surface area of the second ferrule end face; wherein the first lensed connector ferrule and the second lensed connector ferrule are coupled to each other such that a first portion of the first contact surface and a second portion of the second contact surface contact each other to define a contact area; wherein the contact area comprises between less than 1% and 10% of a total surface area, wherein the total surface area is the sum of the first surface area and the second surface area.

In one embodiment, a lensed connector assembly is provided. The lensed connector assembly comprising: a first lensed connector ferrule comprising a first ferrule end face; wherein the first lensed connector ferrule has a first contact surface comprising a portion of a first surface area of the first ferrule end face, the first contact surface comprising between 1% and 50% of the first surface area; a second lensed connector ferrule comprising a second ferrule end face, the second lensed connector coupled to the first lensed connector, wherein the second ferrule end face has the same configuration as the first ferrule end face but is oriented 180 degrees relative to the first ferrule end face when coupled to the first ferrule end face; wherein the second lensed connector ferrule has a second contact surface comprising a portion of a second surface area of the second ferrule end face, the second contact surface comprising between 1% and 50% of the second surface area; wherein the first lensed connector ferrule is coupled to the second lensed connector ferrule to define a contact area where the first contact surface contacts the second contact surface, the contact area comprises between less than 1% and 10% of a total surface area, and the total surface area is the sum of the first surface area and the second surface area.

In another embodiment, the first contact surface comprises at least one raised surface integrally formed with the first ferrule end face. In another embodiment, the first contact surface comprises a first contact ring and a second contact ring spaced from the first contact ring. In another embodiment, the first contact surface comprises a contact ring, wherein the contact ring includes a plurality of raised surfaces, wherein the plurality of raised surfaces are elevated relative to the first contact surface, the plurality of raised surfaces are spaced apart such that a plurality of trenches are between the plurality of ridges. In another embodiment, the first contact surface comprises a plurality of ridges that are elevated relative to the first contact surface and angled relative to a plane defined by a central axis of the first lensed connector ferrule, wherein the plurality of ridges are parallel to each other. In another embodiment, the first ferrule end face comprises a plurality of lens apertures, and wherein the first contact surface further comprises a gasket proximal to a plurality of lens apertures. In another embodiment, the first ferrule end face comprises a plurality of lens apertures, and wherein the first contact surface further comprises a ridge-trench ring that surrounds the plurality of lens apertures; wherein the ridge-trench ring includes a ridge adjacent to a trench, and wherein each of the ridge and the trench span half of a perimeter of the ridge trench ring. In another embodiment, the ridge-trench ring further comprises a first ridge-trench ring and a second ridge-trench ring surrounding the first ridge-trench ring, wherein the first ridge-trench ring and the second ridge-trench ring are proximal to the plurality of lens apertures of the first ferrule end face; wherein the first ridge-trench ring and the second ridge-trench ring are concentric and surround the plurality of lens apertures. In another embodiment, a ridge portion of the first ridge-trench ring is adjacent to a trench portion of the second ridge-trench ring, and a trench portion of the first ridge-trench ring is adjacent to a ridge portion of the second ridge-trench ring.

In another embodiment, the first contact surface comprises a contact ring, wherein the contact ring includes a plurality of raised bumps along the contact ring. In another embodiment, each of the plurality of raised bumps is circular in shape and have an apex height of relative to the first contact surface between 10 µm and 1 mm. In another embodiment, each of the plurality of raised bumps is quadrilateral in shape and have an apex height relative to the first contact surface of between 10 µm and 1 mm. In another embodiment, the contact surface comprises a glass sheet with an aperture and a plurality of raised bumps positioned around a perimeter of the aperture. In another embodiment, the glass sheet covers between 55% and 100% of the first surface area of the first ferrule end face.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 16 is a front view of an alternate ferrule end face of the lensed connector ferrule of FIG. 3 illustrating contact points of the alternate ferrule end face when the lensed connector ferrule is coupled to another lensed connector ferrule;

FIG. 21 is a front view of an alternate ferrule end face of the lensed connector ferrule of FIG. 3 illustrating contact surfaces of the alternate ferrule end face when the lensed connector ferrule is coupled to another lensed connector ferrule;

DETAILED DESCRIPTION

Various embodiments will be clarified by examples in the description below. In general, the present disclosure relates to lensed optical fiber connector ferrule end faces (hereinafter referred to as "connector ferrule end faces" or "ferrule end faces") having molded contact surfaces. The contact surfaces reduce ferrule end face contact area and thereby reduce the influence of trapped dust and debris on lens angular misalignment.

Figure 1:
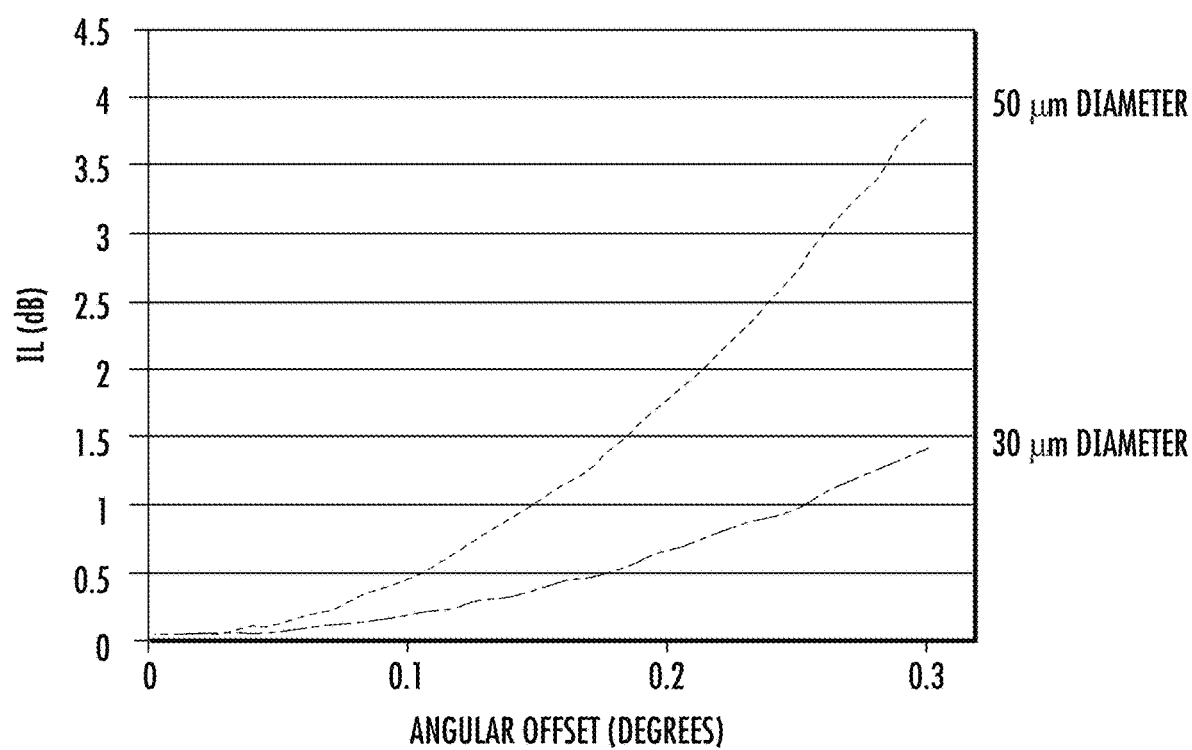
FIG. 1 is a graph illustrating sensitivity of lensed connector ferrule end faces to angular offset or misalignment.
Figure 2:
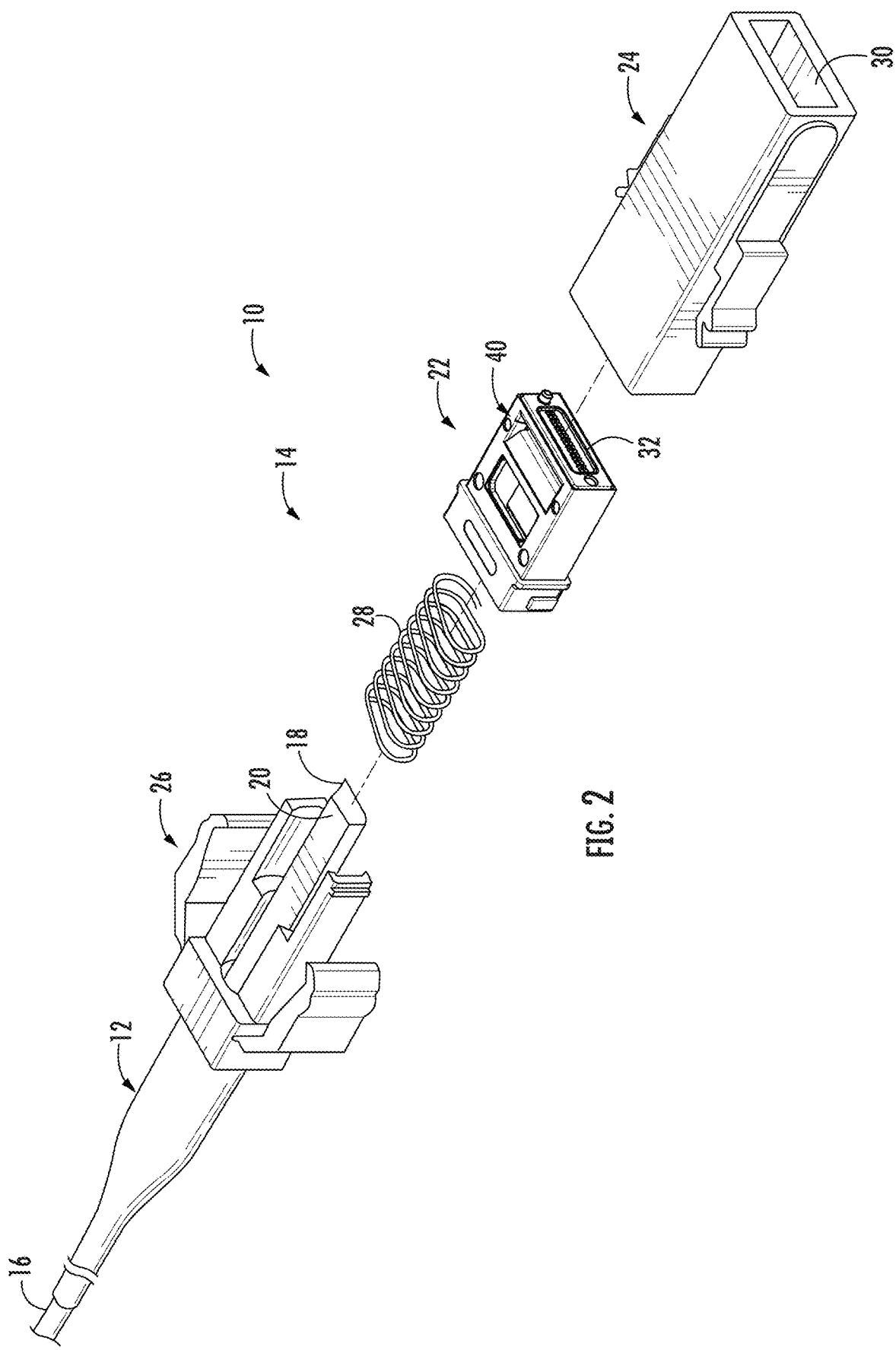
FIG. 2 is a disassembled view of a fiber optic cable assembly.

Referring first to FIG. 2, an exemplary fiber optic cable assembly 10 includes a fiber optic cable 12 and a fiber optic connector 14 (also referred to as "optical connector", or simply "connector"). Although the connector 14 is shown as having the form factor of a MXC® connector (available from US Conec, Ltd., of Hickory, NC, USA), the features described below may be applicable to different connector designs. This includes single-fiber or multi-fiber connector designs. Similarly, the illustrated cable 12 is merely an example to facilitate discussion, and persons skilled in optical connectivity will appreciate how different cable designs may be terminated with the connector 14 to provide different fiber optic cable assemblies. While the fiber optic cable assembly 10 is illustrated as including one connector 14, it should be realized that the fiber optic cable 12 may include a large number of optical fibers and be terminated by multiple connectors 14. Thus, aspects of the present disclosure are not limited to the particular cable 12 and connector 14 shown and described herein.

As will be described in more detail below, the fiber optic connector 14 is configured as a "lensed" connector having an optical element configured to expand and collimate the light beam from the optical fibers of the cable 12 for transmission across an optical joint, such as between two mated connectors or between a connector and other optic component.

The illustrated fiber optic cable 12 of FIG. 2 includes an outer jacket 16 that surrounds and protects a plurality of optical fibers 18. In one embodiment of the disclosure, the optical fibers 18 may be configured as a plurality of ribbons 20 each carrying a plurality of optical fibers 18 (e.g., 12, 16 or 24 optical fibers) arranged in a side-by-side manner. Such ribbons 20 are generally well known in the art and thus will not be described further herein. It should be appreciated that the plurality of optical fibers 18 are not limited to an arrangement of ribbons but may be presented in alternative forms and remain within the scope of the disclosure.

In an exemplary embodiment, the connector 14 includes a ferrule 22 configured to support the plurality of optical fibers 18, a housing 24 having a cavity in which ferrule 22 is received, and a connector retention body 26 configured to support the fiber optic cable 12 and retain the ferrule 22 within the housing 24. The ferrule 22 may be biased to a forward position within the housing 24 by a spring 28. The housing 24 and the connector retention body 26 may be coupled together, such as through a snap fit or the like, to capture the ferrule 22 within the housing 24. When the connector 14 is assembled, a front end 30 of the housing 24 may project beyond a front end 32 of the ferrule 22 to define a cavity. Connector 14 is configured as an expanded beam or lensed connector providing expanded light beams from the optical fibers 18 that travel across a void space or region when two connectors are mated together. The construction and interoperability between the various parts of connector 14 are generally known to persons of ordinary skill in optical connectivity and thus will not described further herein. It should be understood that aspects of the disclosure are not limited to the particular shape, size, and configuration of the ferrule or housing shown and described herein but are applicable to a wide range of ferrule and housing configurations.

Figure 3:
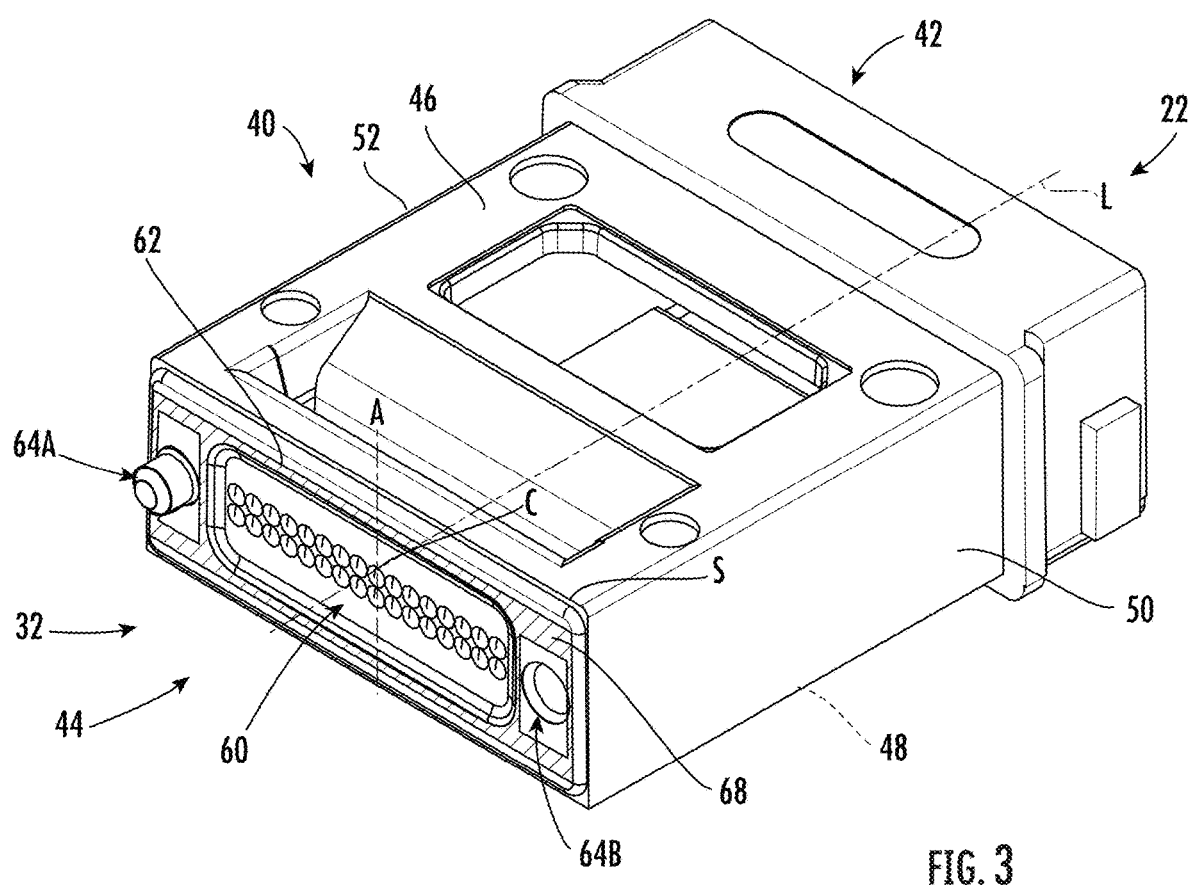
FIG. 3 is a perspective view of a lensed connector ferrule.

FIG. 3 illustrates a ferrule 22 in accordance with an exemplary embodiment of the disclosure. The ferrule 22 includes a generally rectangular body 40 having a rear portion 42, a front portion 44, a top wall 46, bottom wall 48, and generally parallel side walls 50, 52. It should be recognized that while the ferrule 22 is described as having a generally rectangular configuration, aspects of the invention are not limited to such an arrangement. More particularly, ferrule 22 may have a wide range of shapes and sizes and remain within the scope of the present disclosure. The terms "rear" and "forward" refer to positions relative to the main fiber optic cable 12, with "rear" being located closer to the main fiber optic cable 12 than "forward". The rear portion 42 of the ferrule 22 includes an opening for accessing a first internal cavity of the ferrule 22. The first internal cavity is configured to receive the optical fibers 18 from the ribbons 20 carried by the fiber optic cable 12. The forward end of the cavity is closed off by an intermediate wall that defines a plurality of micro-bores 60 each configured to receive a respective optical fiber 18 from the ribbons 20 of the fiber optic cable 12. In some embodiments, micro-bores 60 are oriented in a multiple row configuration as shown. However, it is within the scope of the present disclosure that in alternate embodiments, micro-bores 60 can be in an alternate configuration (e.g., single row).

In general, ferrule 22 includes a ferrule end face 62 that includes a pair of alignment pin holes 64A, 64B that either include a guide pin or include a recess sized to receive precision diameter guide pins and are positioned on opposite sides of micro-bores 60 where lenses 66 are received. In some embodiments, as shown, ferrule 22 is designed to be hermaphroditic where pin hole 64A includes a guide pin and pin hole 64B is a recess configured to receive a guide pin on another connector. However, it is within the scope of the present disclosure that alternate configurations of pin holes 64A, 64B may be used. In some embodiments, ferrule end face 62 is angled (relative to longitudinal axis L) so that it can mate with another ferrule 22 if the other ferrule 22 is rotated 180 degrees about a longitudinal axis L that extends parallel to the fiber array from center C (FIG. 12B) as described herein. In some embodiments, ferrule end face 62 is angled relative to longitudinal axis L (FIG. 12B) at an angle of about 0.05°. As described below, ferrule end face 62 also includes a contact surface 68 that is configured to contact a contact surface of another ferrule. In general, contact surfaces 68 of ferrule end face 62 comprise between less than 1% and 50%, between less than 1% and 40%, or between less than 1% and 30% of a surface area of ferrule end face 62. As used herein, "contact surface" refers to an area of ferrule end face 62 that is configured to contact at least a portion of a ferrule end face 62 of another ferrule 22 in order to define an angular alignment between ferrules 22 and excludes portions of ferrule end face 62 that only function to prevent dust and debris from contacting ferrule end face 62 (e.g., gasket 92, ridge-trench ring 94, etc. described herein).

Below ferrule 22 will be described in greater detail within the context of a first ferrule 22A and a second ferrule 22B where first ferrule 22A is coupled to second ferrule 22B at respective corresponding ferrule end faces 62A, 62B. That is, "ferrule 22" will be referenced as "first ferrule 22A" and "second ferrule 22B" below when describing the structure of ferrule 22 and how first and second ferrules 22A, 22B are coupled. Second ferrule 22B has an identical ferrule end face 68B as ferrule end face 68A of first ferrule 22A; however, when second ferrule 22B is coupled to first ferrule 22A, second ferrule 22B is rotated 180 degrees about longitudinal axis L as discussed below.

When connectors 14 are connected to each other, first ferrule 22A is coupled to second ferrule 22B where at least a portion of the respective contact surfaces of the first ferrule 22A and the second ferrule 22B contact each other to define a contact area. Stated another way, when first ferrule 22A and second ferrule 22B are coupled to each other, at least a portion of the respective contact surfaces are in contact with each other to define a contact area 70. In general, contact area 70 comprises between less than 1% and 10%, between less than 1% and 15%, or between less than 1% and 20% of a total surface area of ferrule end faces 62 of both ferrules 22A, 22B. As used herein, "contact surface" refers to an area of ferrule end face 62 that is configured to contact at least a portion of a ferrule end face 62 of another ferrule 22. As discussed below, the ferrule end face of second ferrule 22B has the same configuration as the end face of first ferrule 22A; however, second ferrule 22B is rotated 180 degrees to couple to first ferrule 22A. As used herein, "contact area" is defined as the area of contact between the first and second contact surfaces when first and second ferrules are coupled to each other.

Figure 4:
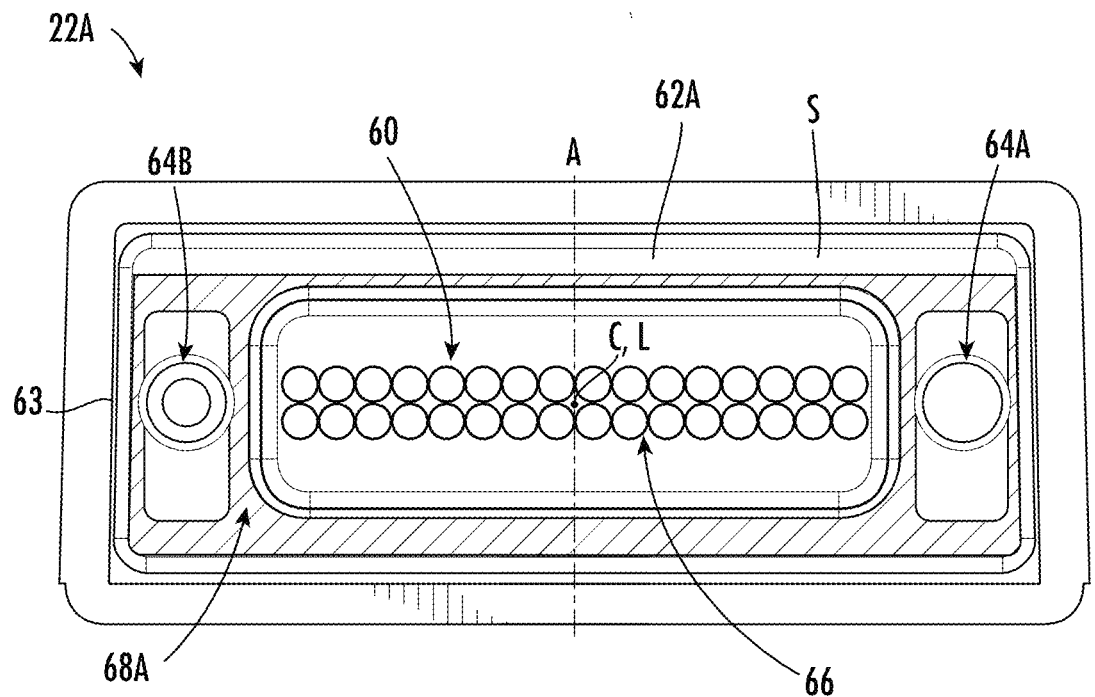
FIG. 4 is a front view of a ferrule end face of the lensed connector ferrule of FIG. 3 illustrating contact surfaces of the ferrule end face when the lensed connector ferrule is coupled to another lensed connector ferrule.
Figure 5:
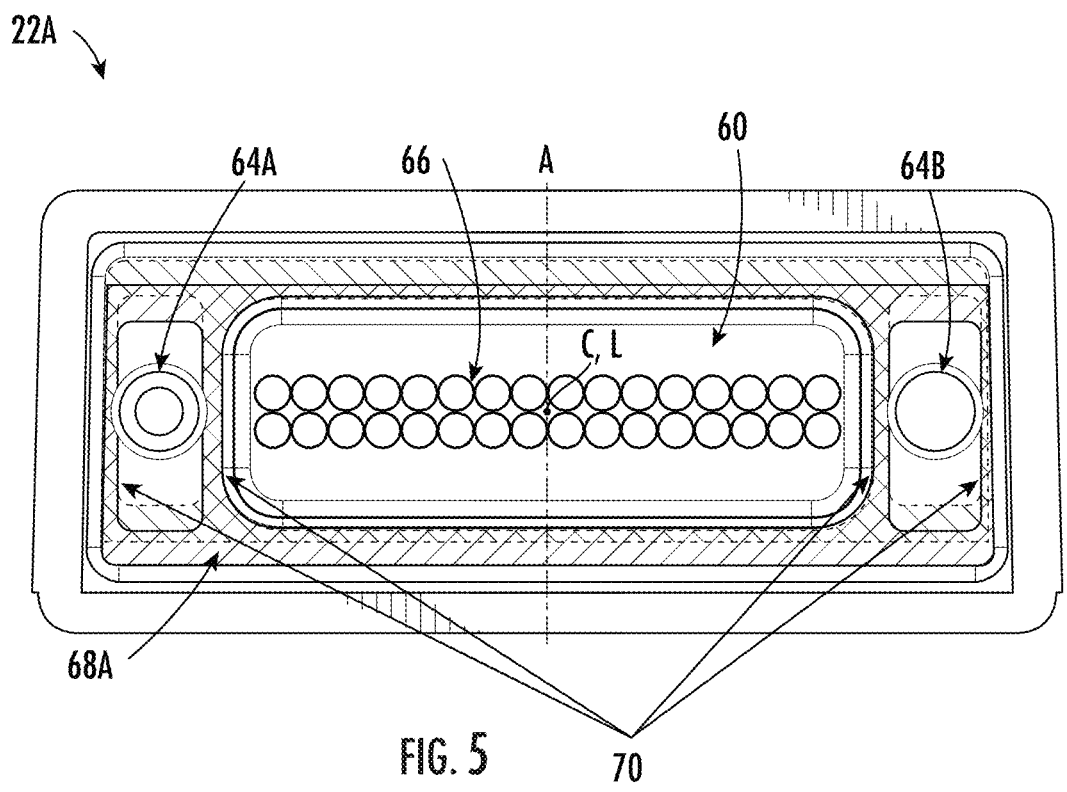
FIG. 5 is a front view of the ferrule end face of FIG. 4 illustrating contact areas when the lensed connector ferrule is coupled with another lensed connector ferrule.

Referring now to FIG. 4, a ferrule end face 62A of first ferrule 22A is shown. As shown, ferrule end face 62A includes a pair of alignment pin holes 64A, 64B positioned on opposite sides of micro-bores 60 where lenses 66 are received. As indicated on FIG. 4, ferrule end face 62A also includes a first contact surface 68A. First contact surface 68A is a raised surface integrally formed with ferrule end face 62A and is configured to contact a second contact surface 68B (FIG. 5) of second ferrule 22B. First contact surface 68A may be raised by at least 1 µm, at least 5 µm, at least 25 µm, or at least 100 µm from non-raised portions 12A of ferrule end face 62A. In some embodiments, first contact surface 68A comprises between 20% and 40%, between 25% and 35%, or between 30% and 35% of a surface area of first ferrule end face 62A. When second ferrule 22B is coupled to first ferrule 22A, there is overlap or contact between first contact surface 68A and second contact surface 68B to define a contact area 70 as shown in FIG. 5. As shown, in one embodiment, contact area 70 includes a plurality of rectangular shaped sections between which alignment pin holes 64A, 64B are positioned. In some embodiments, contact area 70 comprises between 2% and 15%, between 2% and 10%, or between 2% and 5% of a total surface area of first ferrule end face 62A and second ferrule end face 62B. As used herein, "contact surface" refers to a portion of first ferrule end face 62A that is configured to contact another contact surface of second ferrule end face 62B to couple ferrule 22A to ferrule 22B.

Figure 6:
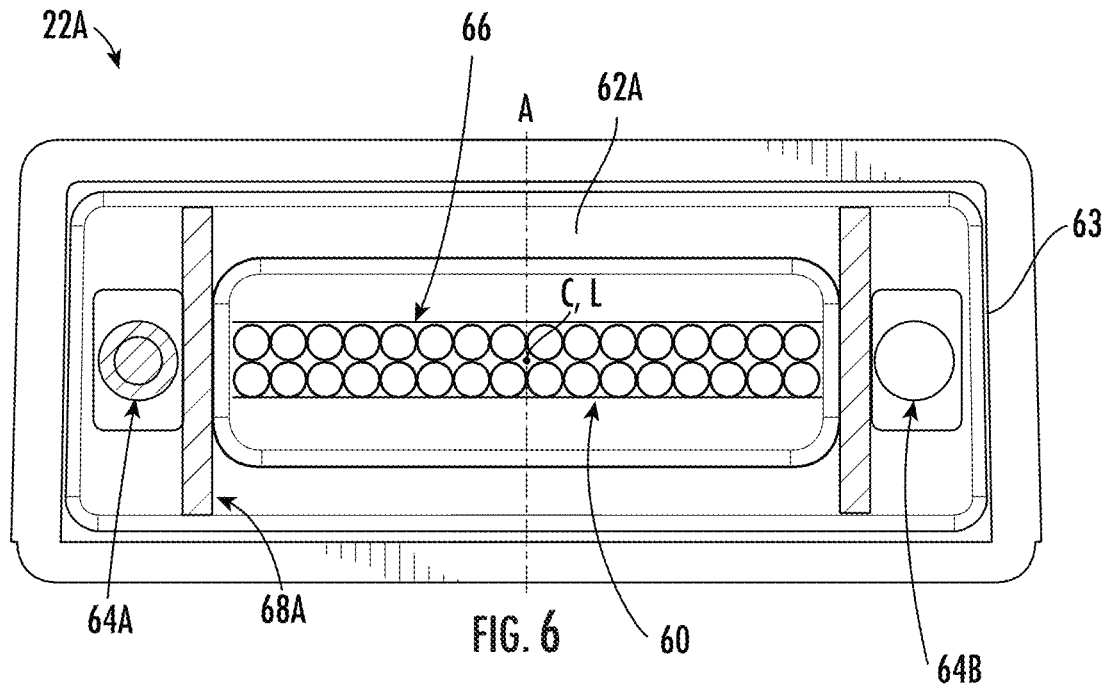
FIG. 6 is a front view of an alternate ferrule end face of the lensed connector ferrule of FIG. 3 illustrating contact surfaces of the alternate ferrule end face when the lensed connector ferrule is coupled to another lensed connector ferrule.

Referring now to FIG. 6, an alternate ferrule end face 62A of first ferrule 22A is shown. As shown, ferrule end face 62A includes a first contact surface 68A. First contact surface 68A is a raised surface integrally formed with ferrule end face 62A and is configured to contact a second contact surface 68B of a second ferrule 22B. In some embodiments, first contact surface 68A comprises between 2% and 25%, between 5% and 20%, or between 7% and 15% of a surface area of first ferrule end face 62A. In this embodiment, first contact surface 68A and second contact surface 68B are substantially congruent when coupling first ferrule 22A to second ferrule 22B due to the symmetric shape of contact surfaces 68A, 68B relative to axis A. Stated another way, when second ferrule 22B is rotated 180 degrees about longitudinal axis L of optical fiber array and lenses 66 to couple to first ferrule 22A, second contact surface 68B is substantially congruent and aligned such that the entirety of first contact surface 68A is in contact with the entirety of second contact surface 68B. As mentioned previously, when second ferrule 22B is coupled to first ferrule 22A, there is overlap or contact between first contact surface 68A and second contact surface 68B to define a contact area 70. As shown, in one embodiment, contact area 70 includes a plurality of rectangular shaped sections between which alignment pin holes 64A, 64B are positioned. In some embodiments, contact area 70 comprises between 2% and 25%, between 5% and 20%, or between 7% and 15% of a total surface area of first ferrule end face 62A and second ferrule end face 62B.

Figure 7:
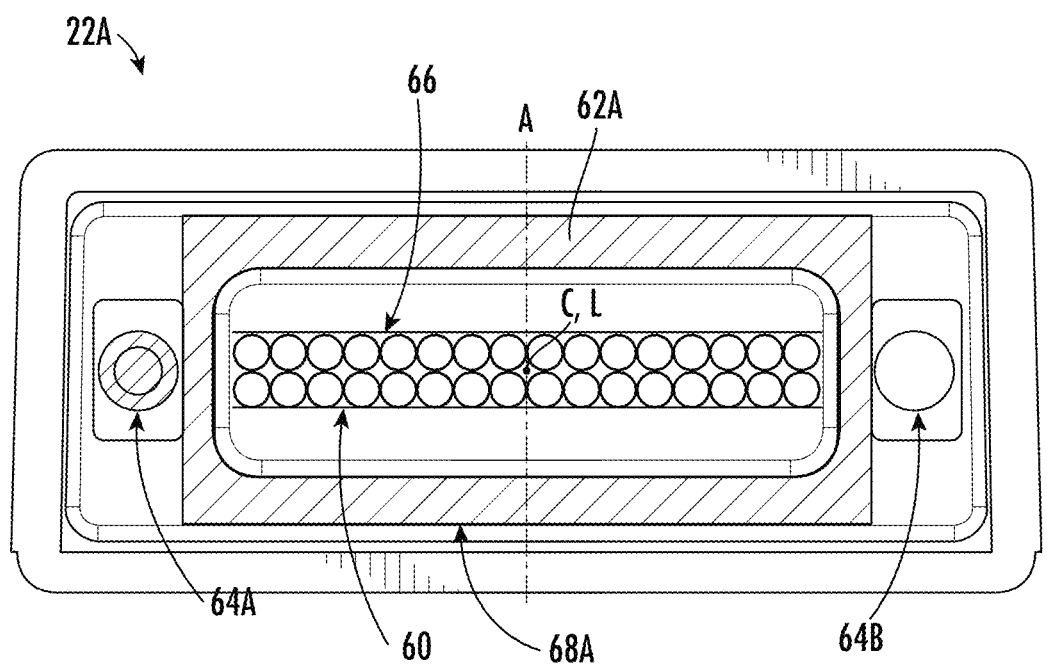
FIG. 7 is a front view of an alternate ferrule end face of the lensed connector ferrule of FIG. 3 illustrating contact surfaces of the alternate ferrule end face when the lensed connector ferrule is coupled to another lensed connector ferrule.

Referring now to FIG. 7, an alternate ferrule end face 62A of first ferrule 22A is shown. As shown, ferrule end face 62A includes a first contact surface 68A that is rectangular in shape and positioned around microbores 60. First contact surface 68A is a raised surface integrally formed with ferrule end face 62A and is configured to contact second contact surface 68B of second ferrule 22B. In some embodiments, first contact surface 68A comprises between 2% and 50%, between 5% and 40%, or between 7% and 30% of a surface area of first ferrule end face 62A. In this embodiment, similar to FIG. 6, first contact surface 68A and second contact surface 68B are substantially congruent when coupling first ferrule 22A to second ferrule 22B due to the symmetric shape of contact surfaces 68A, 68B relative to axis A. Stated another way, when second ferrule 22B is rotated 180 degrees to couple to first ferrule 22A, second contact surface 68B is substantially congruent and aligned such that the entirety of first contact surface 68A is in contact with the entirety of second contact surface 68B. As mentioned previously, when second ferrule 22B is coupled to first ferrule 22A, there is overlap or contact between first contact surface 68A and second contact surface 68B to define a contact area 70. As shown, in one embodiment, contact area 70 includes a rectangular shaped section surrounding microbores 60. In some embodiments, contact area 70 comprises between 2% and 50%, between 5% and 40%, or between 7% and 30% of a total surface area of first ferrule end face 62A and second ferrule end face 62B.

Figure 8:
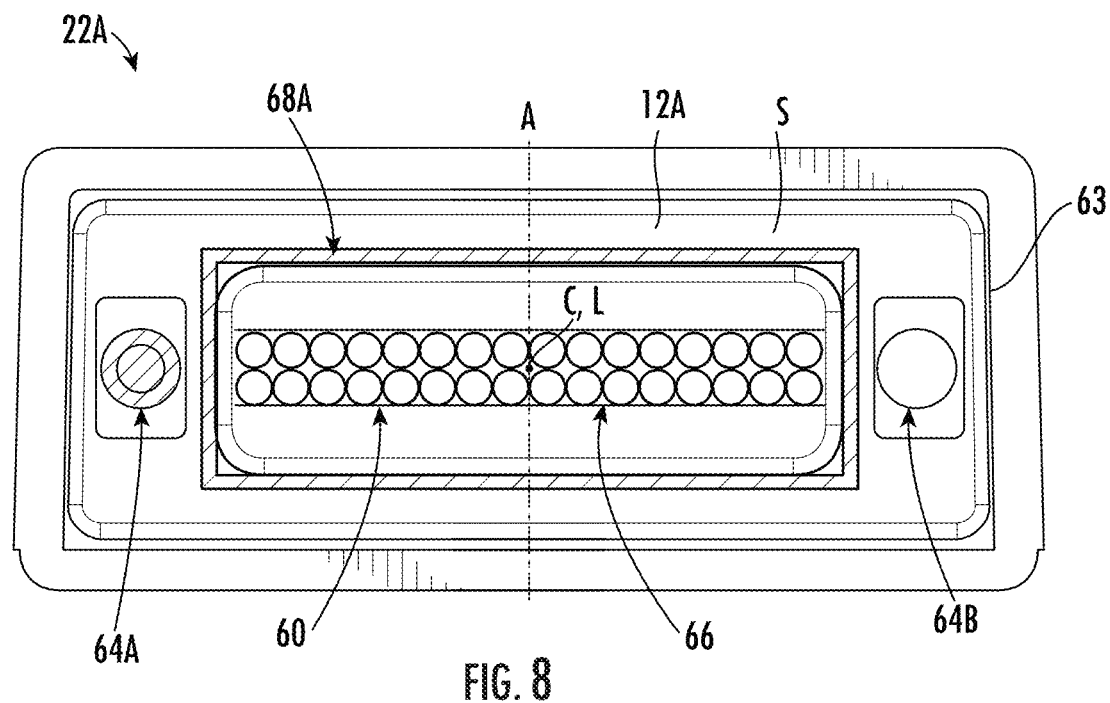
FIG. 8 is a front view of an alternate ferrule end face of the lensed connector ferrule of FIG. 3 illustrating contact surfaces of the alternate ferrule end face when the lensed connector ferrule is coupled to another lensed connector ferrule.

Referring now to FIG. 8, an alternate ferrule end face 62A of first ferrule 22A is shown. As shown, similar to FIG. 7, ferrule end face 62A includes a first contact surface 68A that is rectangular in shape and positioned around microbores 60. First contact surface 68A is a raised surface integrally formed with ferrule end face 62A and is configured to contact second contact surface 68B of second ferrule 22B. In some embodiments, first contact surface 68A comprises between less than 1% and 25%, between less than 1% and 20%, or between less than 1% and 15% of a surface area of first ferrule end face 62A. In this embodiment, first contact surface 68A and second contact surface 68B are substantially congruent when coupling first ferrule 22A to second ferrule 22B due to the symmetric shape of contact surfaces 68A, 68B relative to axis A. Stated another way, when second ferrule 22B is rotated 180 degrees to couple to first ferrule 22A, second contact surface 68B is substantially congruent and aligned such that the entirety of first contact surface 68A is in contact with the entirety of second contact surface 68B. As mentioned previously, when second ferrule 22B is coupled to first ferrule 22A, there is overlap or contact between first contact surface 68A and second contact surface 68B to define a contact area 70. As shown, in one embodiment, contact area 70 includes a rectangular shaped section surrounding microbores 60. In some embodiments, contact area 70 comprises between less than 1% and 25%, between less than 1% and 20%, or between less than 1% and 15% of a total surface area of first ferrule end face 62A and second ferrule end face 62B.

Figure 9:
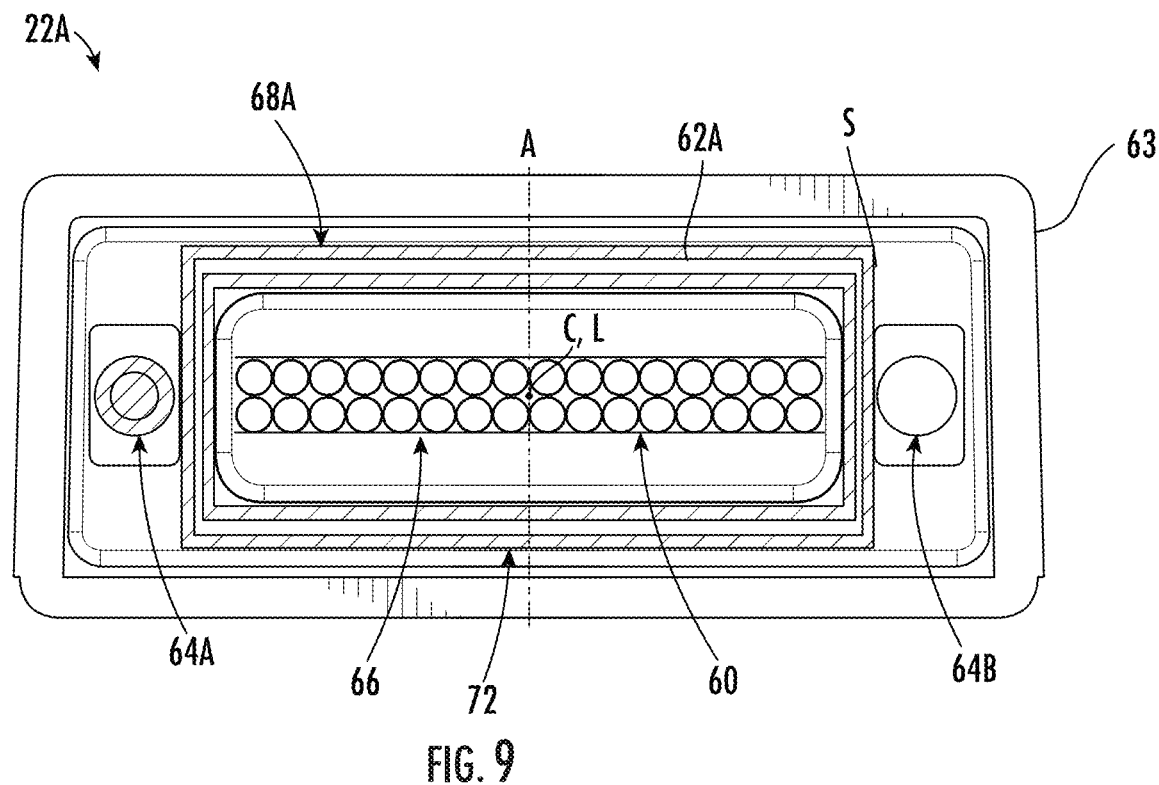
FIG. 9 is a front view of an alternate ferrule end face of the lensed connector ferrule of FIG. 3 illustrating contact surfaces of the alternate ferrule end face when the lensed connector ferrule is coupled to another lensed connector ferrule.

Referring now to FIG. 9, an alternate ferrule end face 62A of first ferrule 22A is shown. As shown, similar to FIG. 7, ferrule end face 62A includes a first contact surface 68A that comprises two rectangular shaped raised surfaces that are positioned around microbores 60. In some embodiments, the rectangular shaped raised surfaces are spaced apart from each other thereby, creating a valley or trench 72 therebetween. The rectangular shaped raised surfaces are also concentric with each other relative to a center C. In this embodiment, trench 72 provides a place for dust and debris that is trapped in first contact surface 68A to be displaced to during connector ferrule mating. As mentioned previously, first contact surface 68A is integrally formed with ferrule end face 62A and is configured to contact second contact surface 68B of second ferrule 22B. In some embodiments, first contact surface 68A comprises between 10% and 40%, between 15% and 35%, or between 15% and 30% of a surface area of first ferrule end face 62A. In this embodiment, first contact surface 68A and second contact surface 68B are substantially congruent when coupling first ferrule 22A to second ferrule 22B due to the symmetric shape of contact surfaces 68A, 68B relative to axis A. Stated another way, when second ferrule 22B is rotated 180 degrees to couple to first ferrule 22A, second contact surface 68B is substantially congruent and aligned such that the entirety of first contact surface 68A is in contact with the entirety of second contact surface 68B. As mentioned previously, when second ferrule 22B is coupled to first ferrule 22A, there is overlap or contact between first contact surface 68A and second contact surface 68B to define a contact area 70. As shown, in one embodiment, contact area 70 includes a plurality of rectangular shaped sections surrounding microbores 60. In some embodiments, contact area 70 comprises between 10% and 40%, between 15% and 35%, or between 15% and 30% of a total surface area of first ferrule end face 62A and second ferrule end face 62B.

Advantageously, the ring shape of first contact surfaces 68A of FIGS. 7-9 about microbores 60 provide a dust sealing ring around the fiber array and microbores 60. When first contact surface 68A is coupled to second contact surface 68B, contact area 70 serves as a barrier that prevents additional dust and debris from reaching the fiber array lenses during connector deployment.

Figure 10:
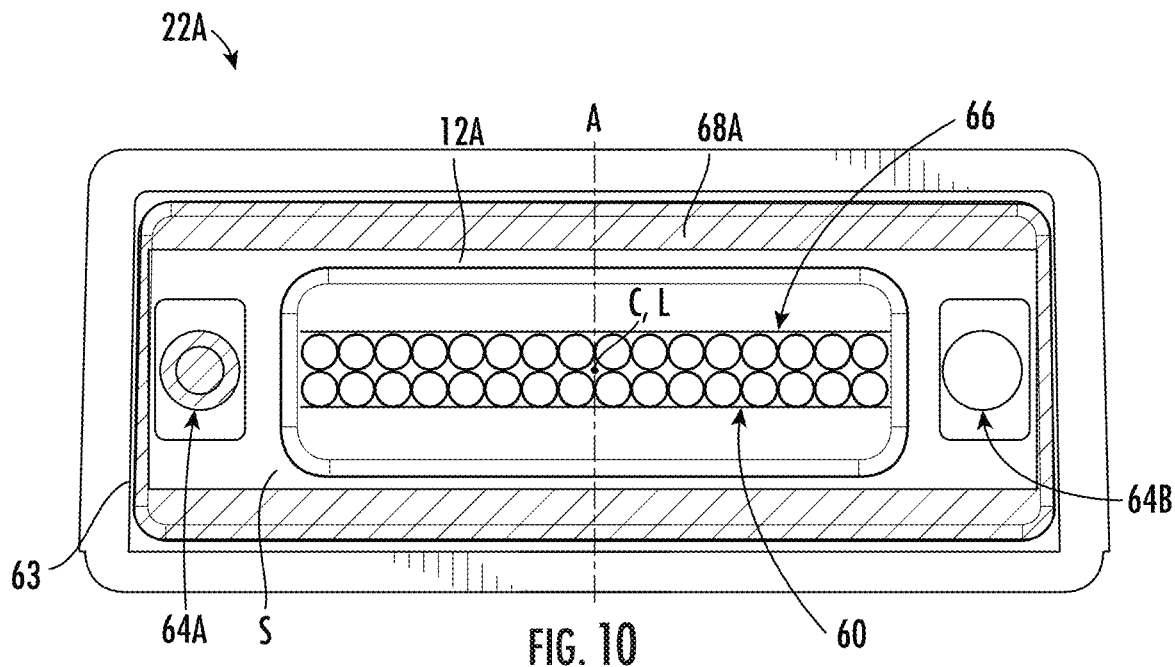
FIG. 10 is a front view of an alternate ferrule end face of the lensed connector ferrule of FIG. 3 illustrating contact surfaces of the alternate ferrule end face when the lensed connector ferrule is coupled to another lensed connector ferrule.
Figure 11:
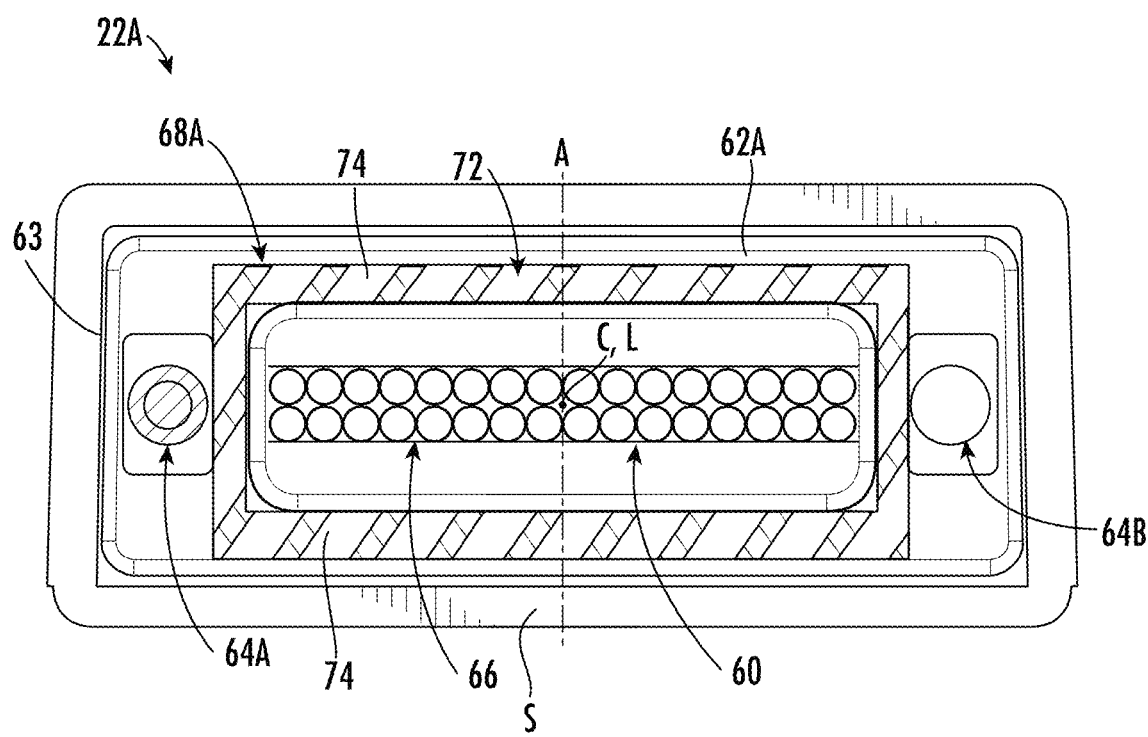
FIG. 11 is a front view of an alternate ferrule end face of the lensed connector ferrule of FIG. 3 illustrating contact surfaces of the alternate ferrule end face when the lensed connector ferrule is coupled to another lensed connector ferrule.

Referring now to FIG. 10, an alternate ferrule end face 62A of first ferrule 22A is shown. As shown, ferrule end face 62A includes a first contact surface 68A that comprises a rectangular shaped raised surface along a periphery of ferrule end face 68A surrounding ferrule end face 68A. Advantageously, because first contact surface 68A is farther away from microbores 60, larger particles of dust and debris can be tolerated in first contact surface 68A while maintaining angular alignment between ferrules 22A, 22B. As mentioned previously, first contact surface 68A is integrally formed with ferrule end face 62A and is configured to contact second contact surface 68B of second ferrule 22B. In some embodiments, first contact surface 68A comprises between 10% and 40%, between 15% and 35%, or between 15% and 30% of a surface area of first ferrule end face 62A. In this embodiment, first contact surface 68A and second contact surface 68B are substantially congruent when coupling first ferrule 22A to second ferrule 22B due to the symmetric shape of contact surfaces 68A, 68B relative to axis A. Stated another way, when second ferrule 22B is rotated 180 degrees to couple to first ferrule 22A, second contact surface 68B is substantially congruent and aligned such that the entirety of first contact surface 68A is in contact with the entirety of second contact surface 68B. As mentioned previously, when second ferrule 22B is coupled to first ferrule 22A, there is overlap or contact between first contact surface 68A and second contact surface 68B to define a contact area 70. As shown, in one embodiment, contact area 70 includes a rectangular-shaped section surrounding ferrule end face 62A. In some embodiments, contact area 70 comprises between 10% and 40%, between 15% and 35%, or between 15% and 30% of a total surface area of first ferrule end face 62A and second ferrule end face 62B.

In comparison with the embodiments shown in FIGS. 7-9, the embodiment of FIG. 10 has first contact surface 68A that is positioned away from the fiber arrays in microbores 60. The position of first contact surface 68A also reduces the angular misalignment induced by a particle of dust or debris that becomes trapped in the contact area 70 between the connector ferrule contact surfaces. The farther that contact areas 70 can be moved from the fiber array, the larger the particle of dust or debris that can be tolerated in contact area 70.

Figure 12A:
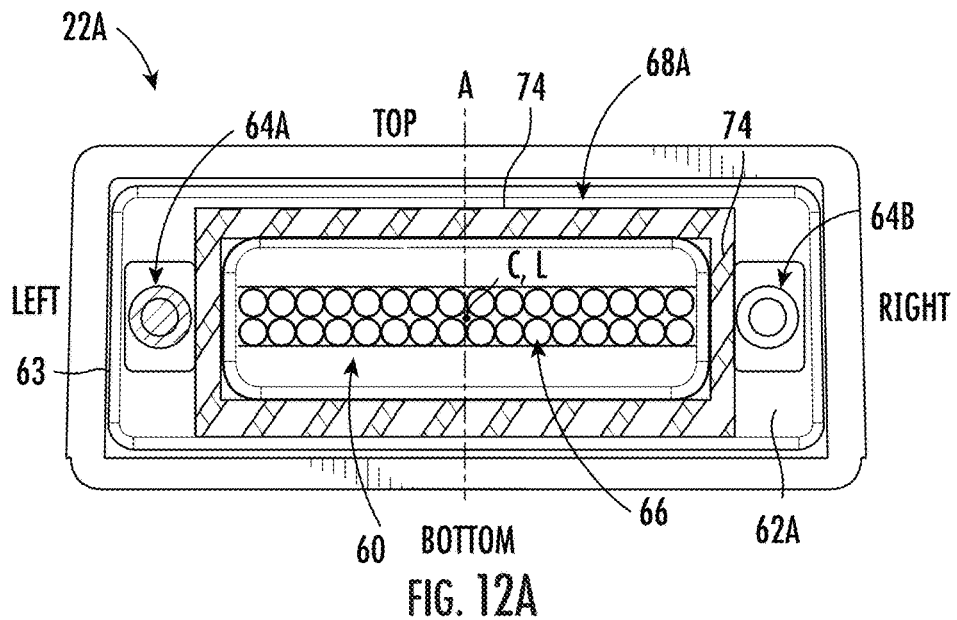
FIG. 12A is a reproduced front view of the alternate ferrule end face of FIG. 11.
Figure 12B:
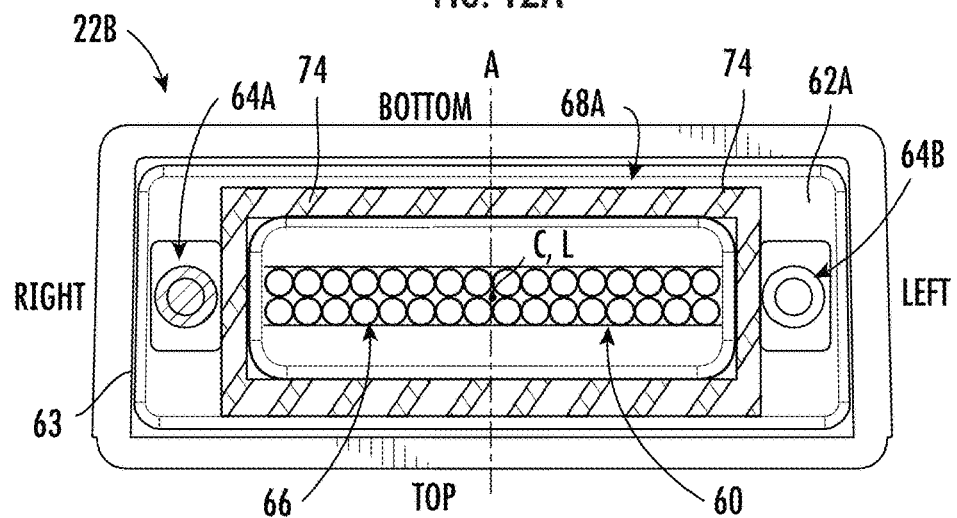
FIG. 12B is a front view of the other ferrule end face of FIG. 12A that couples to the ferrule end face of FIG. 12A illustrating contact surfaces of the other ferrule end face.
Figure 12C:
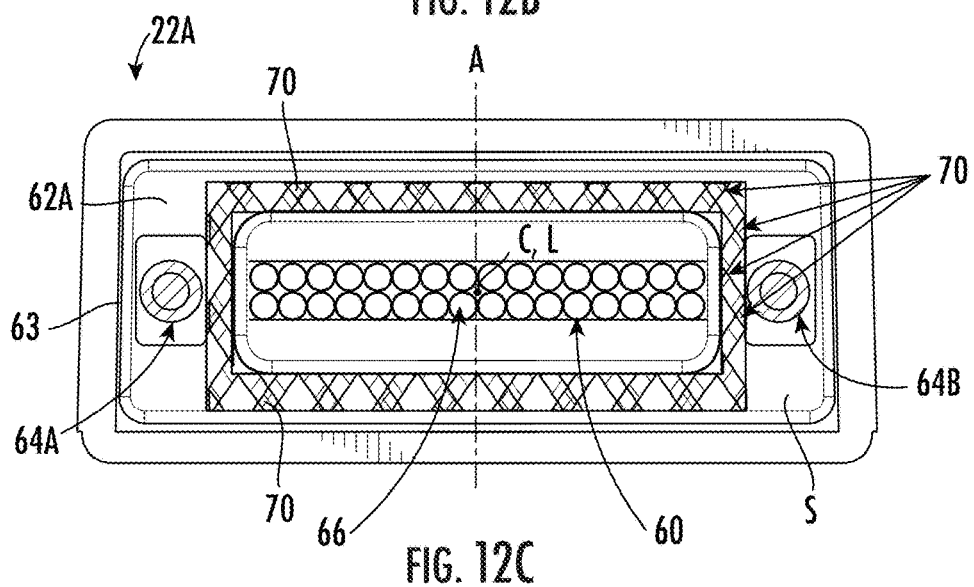
FIG. 12C is a front view of the ferrule end face of FIG. 12A illustrating contact areas when the lensed connector ferrule is coupled with another lensed connector ferrule.

Referring to FIGS. 11 and 12A-12C, an alternate ferrule end face 62A of first ferrule 22A is shown. As shown, ferrule end face 62A includes a first contact surface 68A that comprises a plurality of diagonal raised surfaces 74 (raised relative to first contact surface 68A) that are spaced apart and generally form a rectangular shape surrounding microbores 60. Raised surfaces 74 are angled with respect to a plane defined by axis A (parallel to edge 63 of ferrule end face 62A) that includes center C of ferrule end face 62A. In some embodiments, raised surfaces 74 have an angle ranging between 5° and 90°. In some embodiments, raised surfaces 74 are at an angle of about 45° relative to axis A. As mentioned previously, raised surfaces 74 are spaced apart from each other, which creates trenches 76 between raised surfaces 74. In some embodiments, first contact surface 68A comprises between 5% and 40%, between 10% and 35%, or between 15% and 30% of a surface area of first ferrule end face 62A. Raised surfaces 74 of first contact surface 68A are integrally formed with ferrule end face 62A and are configured to contact second contact surface 68B of second ferrule 22B. As shown in FIG. 12B, second ferrule 22B has the same configuration of first ferrule 22A, and prior to coupling, second ferrule 22B is rotated 180 degrees about a longitudinal axis L that extends through center C (where longitudinal axis L is defined as an axis parallel to the optical fibers in the optical fiber array inserted into microbores 60, located at the center of the optical fiber array). In this embodiment, as shown in FIG. 12C, first ferrule 22A and second ferrule 22B are coupled to each other with second ferrule 22B and second ferrule end face 62B are removed. As shown, when second ferrule 22B is coupled to first ferrule 22A, when second ferrule 22B is coupled to first ferrule 22A, ribs 78 of first ferrule 22A and second ferrule 22B contact each other and provide a high surface area tortuous path that acts as a filter to prevent dust and debris from affecting optical fibers in microbores 60. In some embodiments, the surfaces of ribs 78 are treated with coatings that either promote trapping of dust and debris or that tend to repel dust and debris.

Also, there is overlap or contact between raised surfaces 74 of first contact surface 68A and raised surfaces 74 of second contact surface 68B to define a contact area 70. In some embodiments, contact area 70 comprises between less than 1% and 25%, between less than 1% and 20%, or between less than 1% and 15% of a total surface area of first ferrule end face 62A and second ferrule end face 62B.

Referring to FIGS. 13 and 13A-13D, an alternate ferrule end face 62A of first ferrule 22A is shown. As shown, ferrule end face 62A includes a first contact surface 68A that comprises a plurality of ribs 78 that are spaced apart and located at discrete locations on ferrule end face 62A, and the top surfaces of ribs 78 lie in the same plane. Similar to raised surfaces 74, ribs 78 are angled with respect to a plane defined by axis A that includes center C of ferrule end face 62A. In some embodiments, raised surfaces 74 have an angle ranging between 0' and 90'. In some embodiments, first contact surface 68A comprises between 1% and 10%, between 1% and 7.5%, or between 1% and 5% of a surface area of first ferrule end face 62A. Ribs 78 of first contact surface 68A are integrally formed with ferrule end face 62A and are configured to contact ribs 78 of second contact surface 68B of second ferrule 22B.

Figure 13:
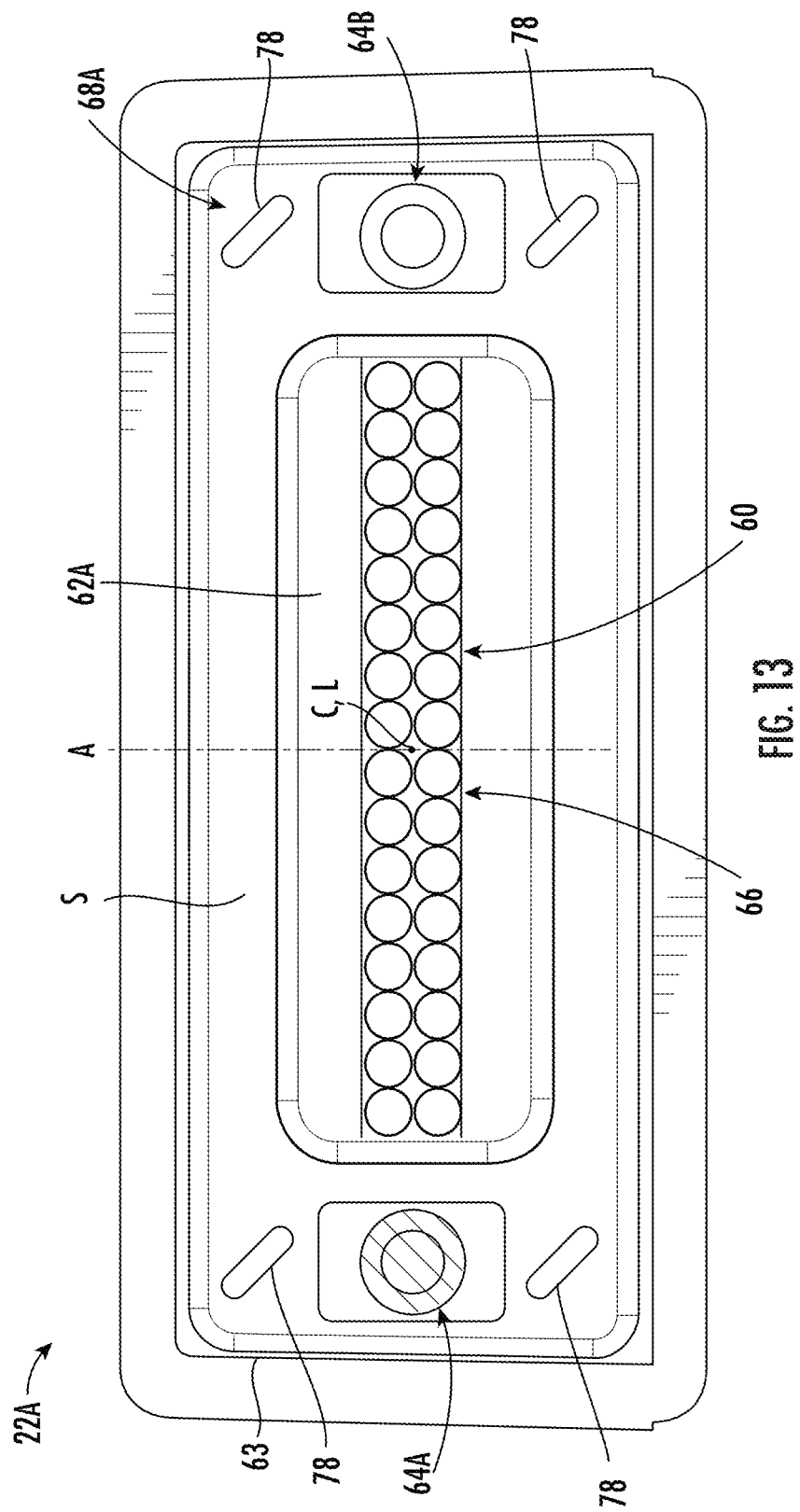
FIGS. 13 and 13A are front views of an alternate ferrule end face of the lensed connector ferrule of FIG. 3 illustrating contact surfaces of the alternate ferrule end face when the lensed connector ferrule is coupled to another lensed connector ferrule.
Figure 13A:
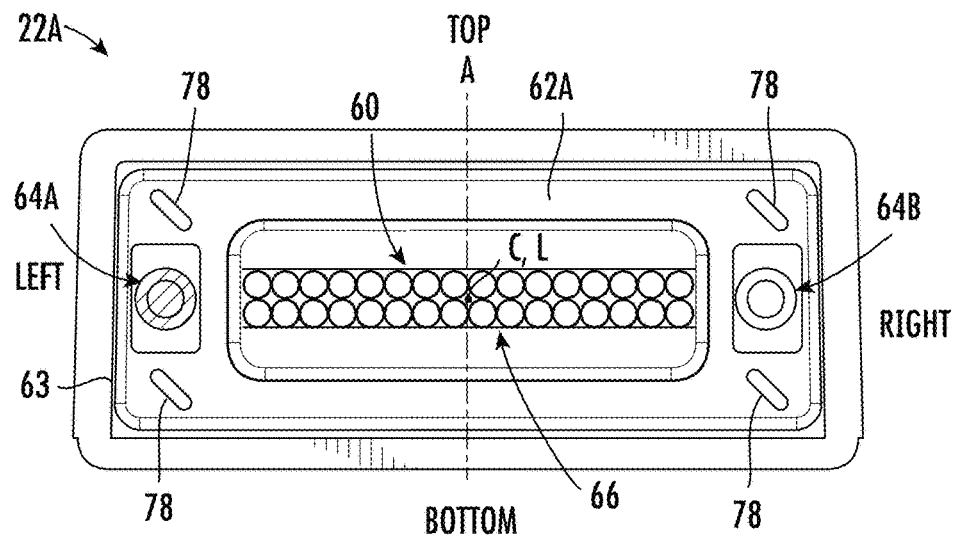
Figure 13B:
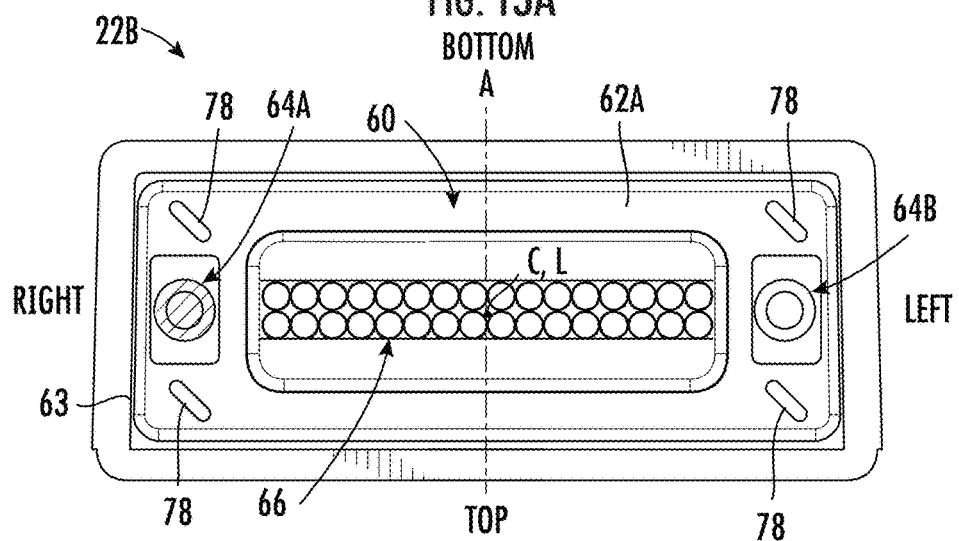
FIG. 13B is a front view of the other ferrule end face of FIG. 13A that couples to the ferrule end face of FIG. 13A illustrating contact surfaces of the other ferrule end face.
Figure 13C:
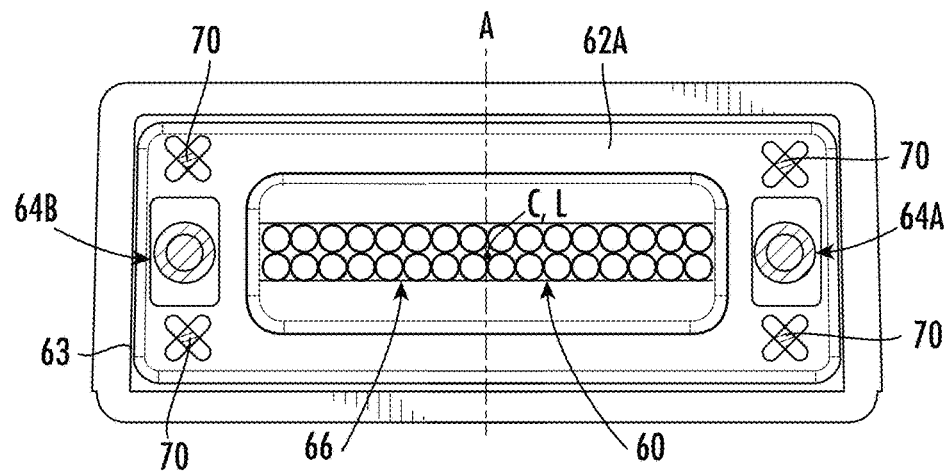
FIG. 13C is a front view of the ferrule end face of FIG. 13A illustrating contact areas when the lensed connector ferrule is coupled with another lensed connector ferrule.

As shown in FIG. 13B, second ferrule 22B has the same configuration of first ferrule 22A, and prior to coupling, second ferrule 22B is rotated 180 degrees about a longitudinal axis L that extends through center C. In this embodiment, as shown in FIG. 13C, first ferrule 22A and second ferrule 22B are coupled to each other with second ferrule 22B and second ferrule end face 62B removed. As shown, when coupling first ferrule 22A and second ferrule 22B, there is overlap or contact between 78 of first contact surface 68A and ribs 78 of second contact surface 68B to define a contact area 70. In some embodiments, contact area 70 comprises single points of contact between ribs 78 of first and second contact surfaces 68A, 68B. Advantageously, such limited contact between ribs 78 enables ferrules 22A, 22B to be insensitive to trapped dust and debris because of their small areas. Additionally, during connector ferrule mating, the connector axial contact force at contact areas 70 produces a high pressure that can compact trapped dust and debris. Moreover, there are regions around contact areas 70 to which dust and debris can move during connector ferrule mating. In some embodiments, contact area 70 is less than 1% of a total surface area of first ferrule end face 62A and second ferrule end face 62B.

Figure 14:
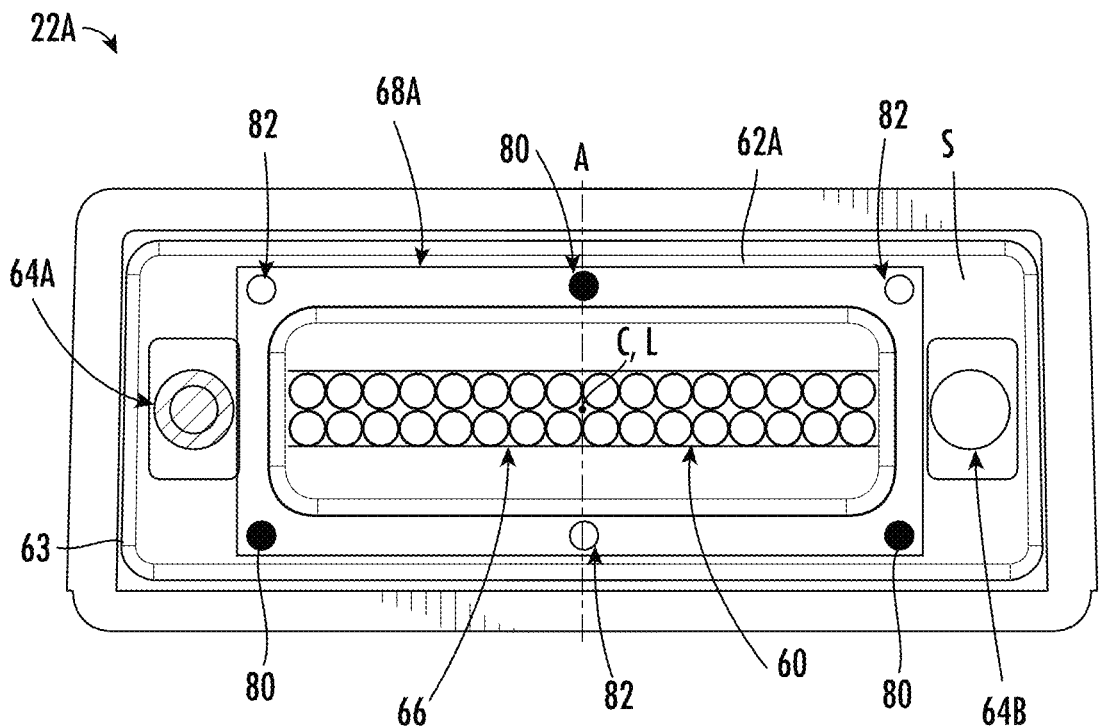
FIG. 14 is a front view of an alternate ferrule end face of the lensed connector ferrule of FIG. 3 illustrating contact points of the alternate ferrule end face when the lensed connector ferrule is coupled to another lensed connector ferrule.

Referring now to FIG. 14, an alternate ferrule end face 62A of first ferrule 22A is shown. As shown, ferrule end face 62A includes a first contact surface 68A that is rectangular in shape and positioned around microbores 60. First contact surface 68A also includes raised bumps 80 that are spaced apart within first contact surface 68A, and raised bumps 80 have the same height such that apexes of each raised bump 60 lie in the same plane. Raised bumps 80 can have a spherical, conical, Gaussian, or other raised profile. In some embodiments, first contact surface 68A and raised bumps 80 positioned closer to the perimeter or edges of ferrule end face 62A. Raised bumps 80 are configured to contact a second contact surface 68B of a second ferrule 22B when first ferrule 22A and second ferrule 22B are coupled to each other. In some embodiments, bumps 80 have an apex height ranging between 0.2 µm and 200 µm, between 5 µm and 100 µm, or between 10 µm and 50 µm. Bumps 80 can be greater than 10 µm, greater than 100 µm, or greater than 500 µm in diameter. As mentioned previously, first contact surface 68A is a raised surface integrally formed with ferrule end face 62A and is configured to contact second contact surface 68B of second ferrule 22B. In some embodiments, first contact surface 68A comprises between 5% and 40%, between 10% and 35%, or between 15% and 30% of a surface area of first ferrule end face 62A. In some embodiments, bumps 80 are semicircular in shape. However, it is within the scope of the present disclosure that alternate bumps 80 may be used. As used herein, "apex height" refers to the maximum height of a bump 80 from first contact surface 68A upon which bump 80 rests.

When second ferrule 22B is rotated 180 degrees (to couple to first ferrule 22A) and coupled to first ferrule 22A, bumps 80 of second contact surface 68B of second ferrule 22A contact first contact surface 68A of first ferrule 22A at contact points 82 as shown, and bumps 80 of first contact surface 68A contact second contact surface 68B at similar contact points 82. In some embodiments, bumps 80 and contact points 82 can be move towards the periphery of respective ferrule end faces 62A, 62B. Contact points 82 between first ferrule 22A and second ferrule 22B define a contact area 70 in this embodiment. In some embodiments, contact area 70 comprises less than 1% of a total surface area of first ferrule end face 62A and second ferrule end face 62B.

Figure 15:
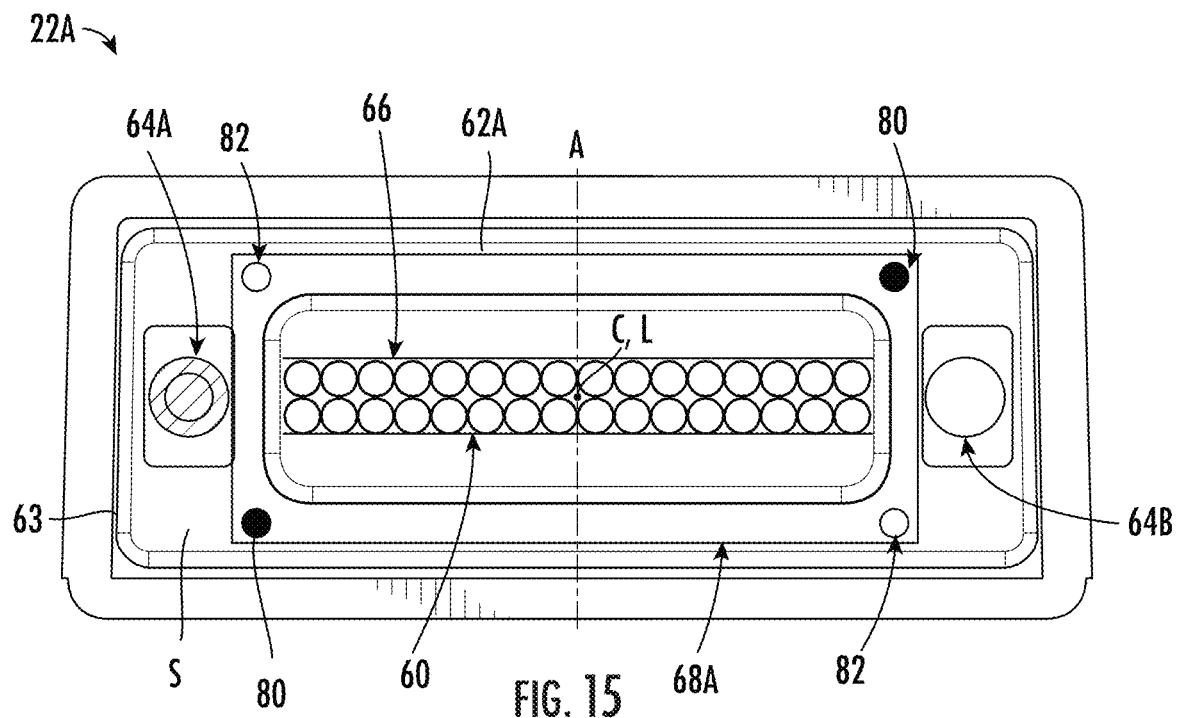
FIG. 15 is a front view of an alternate ferrule end face of the lensed connector ferrule of FIG. 3 illustrating contact points of the alternate ferrule end face when the lensed connector ferrule is coupled to another lensed connector ferrule.

FIG. 15 is substantially the same embodiment as described in FIG. 14 except as noted below. As shown, fewer raised bumps 80 are included along first contact surface 68A. In particular, bumps 80 are diagonally spaced apart where first contact surface 68A is a quadrilateral surrounding microbores 60 (i.e., bumps 80 are located at the corners of first contact surface 68A. As mentioned previously, when second ferrule 22B is rotated 180 degrees (to couple to first ferrule 22A) and coupled to first ferrule 22A, bumps 80 of second contact surface 68B of second ferrule 22A contact first contact surface 68A of first ferrule 22A at contact points 82 as shown, and bumps 80 of first contact surface 68A contact second contact surface 68B at similar contact points 82. Contact points 82 between first ferrule 22A and second ferrule 22B define a contact area 70 in this embodiment. In some embodiments, contact area 70 comprises less than 1% of a total surface area of first ferrule end face 62A and second ferrule end face 62B.

Referring now to FIG. 16, an alternate ferrule end face 62A of first ferrule 22A is shown. As shown, ferrule end face 62A includes a first contact surface 68A that is rectangular in shape and positioned around microbores 60. First contact surface 68A also includes raised bumps 80 that are spaced apart within first contact surface 68A. As shown, in this embodiment, raised bumps 80 are in the shape of a quadrilateral. Raised bumps 80 are configured to contact a second contact surface 68B of a second ferrule 22B when first ferrule 22A and second ferrule 22B are coupled to each other. In some embodiments, bumps 80 have an apex height ranging between 0.2 µm and 200 µm, between 5 µm and 100 µm, or between 10 µm and 50 µm. As mentioned previously, first contact surface 68A is a raised surface integrally formed with ferrule end face 62A and is configured to contact second contact surface 68B of second ferrule 22B. In some embodiments, first contact surface 68A comprises between 5% and 40%, between 10% and 35%, or between 15% and 30% of a surface area of first ferrule end face 62A. In some embodiments, bumps 80 are semicircular in shape. However, it is within the scope of the present disclosure that alternate bumps 80 may be used.

When second ferrule 22B is rotated 180 degrees (to couple to first ferrule 22A) and coupled to first ferrule 22A, bumps 80 of second contact surface 68B of second ferrule 22A contact first contact surface 68A of first ferrule 22A at contact points 82 as shown, and bumps 80 of first contact surface 68A contact second contact surface 68B at similar contact points 82. Contact points 82 between first ferrule 22A and second ferrule 22B define a contact area 70 in this embodiment. In some embodiments, contact area 70 comprises less than 1% of a total surface area of first ferrule end face 62A and second ferrule end face 62B.

Figure 17A:
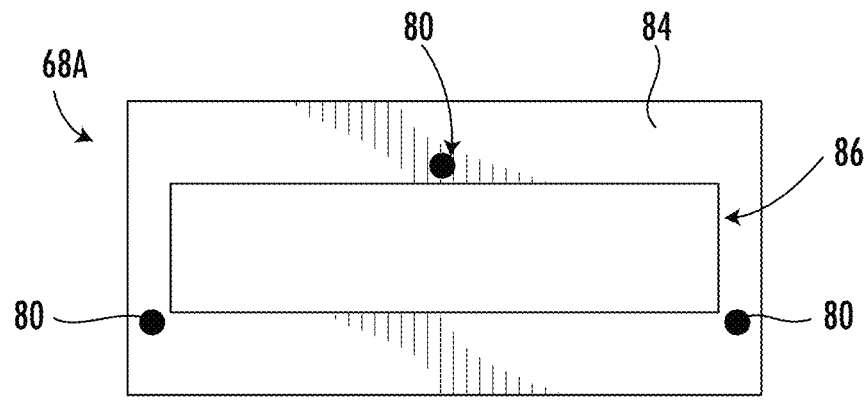
FIG. 17A is a front view of an alternate ferrule end face of the lensed connector ferrule of FIG. 3.
Figure 17B:
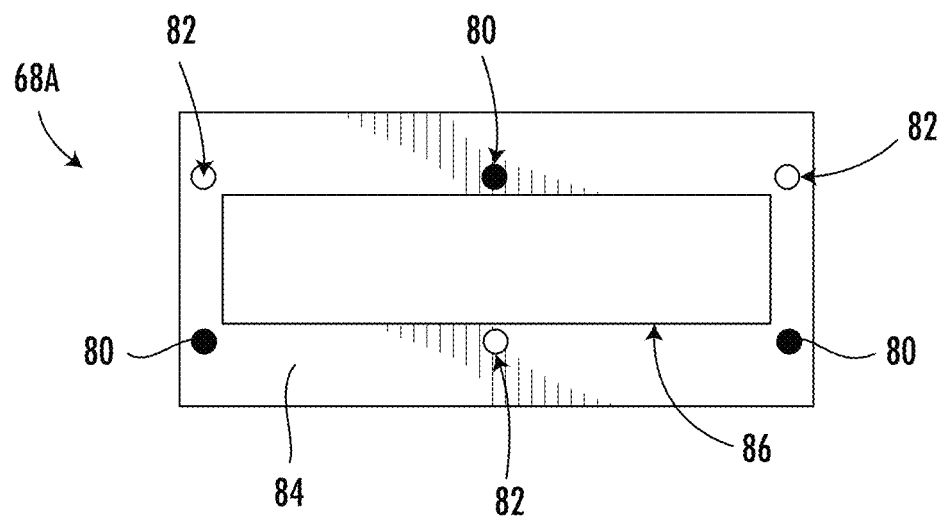
FIG. 17B is a front view of the alternate ferrule end face of the lensed connector ferrule of FIG. 17A illustrating contact points of the alternate ferrule end face when the lensed connector ferrule is coupled to another lensed connector ferrule.
Figure 18:
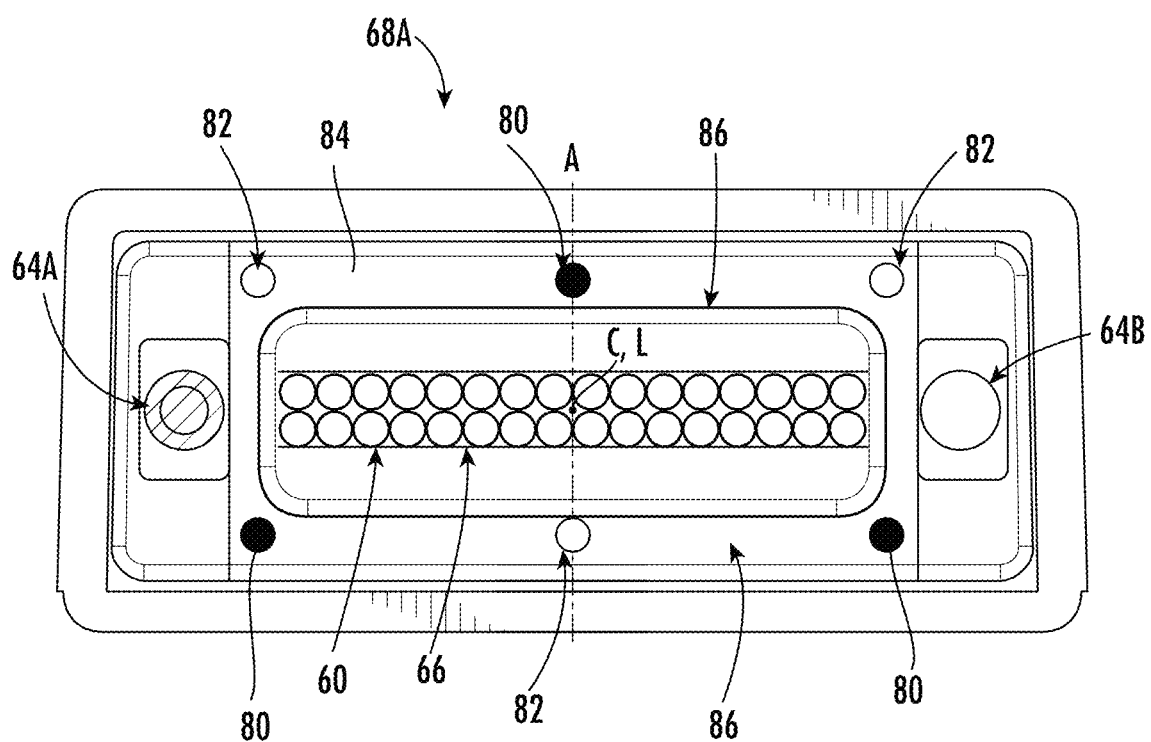
FIG. 18 is a front view of an alternate ferrule end face of the lensed connector ferrule of FIG. 3 illustrating contact points of the alternate ferrule end face when the lensed connector ferrule is coupled to another lensed connector ferrule.

Referring now to FIGS. 17A, 17B, and 18, first contact surface 68B is shown. In this embodiment, first contact surface 68B comprises a glass sheet 84 having an aperture 86 within glass sheet 84. Glass sheet 84 is configured to be applied onto first ferrule end face 62A such that at least a portion of ferrule end face 62A is not covered by glass sheet 84 as shown in FIG. 18. In some embodiments, glass sheet 84 has a thickness of about 0.7 mm. Aperture 86 is sized and configured to provide clearance for expanded beam propagation so that anti-reflection coatings are not required on glass sheet 84. In some embodiments, first contact surface 68A comprises between 40% and 70%, between 45% and 65%, or between 50% and 60% of a surface area of first ferrule end face 62A.

Glass sheet 84 also comprises a plurality of raised bumps 80 located about the perimeter of aperture 86. Bumps 80 can be formed by laser processing where glass of glass sheet 84 swells when rapidly heated by an infrared laser pulse. In some embodiments, bumps 80 can be greater than 10 µm, greater than 100 µm, or greater than 500 µm in diameter. As mentioned previously, raised bumps 80 are configured to contact a second contact surface 68B of a second ferrule 22B when first ferrule 22A and second ferrule 22B are coupled to each other. In some embodiments, each of bumps 80 have an apex height ranging between 0.1 µm and 70 µm, between 0.1 µm and 50 µm, or between 0.1 µm and 40 µm. In some embodiments, bumps 80 have a height of about 0.5 µm or about 1 µm. In some embodiments, bumps 80 are semicircular in shape. However, it is within the scope of the present disclosure that alternate bumps 80 may be used. As used herein, "apex height" refers to the maximum height of a bump 80 from first contact surface 68A (i.e., glass sheet 84) upon which bump 80 rests.

When second ferrule 22B is rotated 180 degrees (to couple to first ferrule 22A) and coupled to first ferrule 22A, bumps 80 of second contact surface 68B of second ferrule 22A contact first contact surface 68A of first ferrule 22A at contact points 82 shown in FIGS. 17B and 18, and bumps 80 of first contact surface 68A contact second contact surface 68B at similar contact points 82. Contact points 82 between first ferrule 22A and second ferrule 22B define a contact area 70 in this embodiment. In some embodiments, contact area 70 comprises less than 1% of a total surface area of first ferrule end face 62A and second ferrule end face 62B.

Figure 19A:
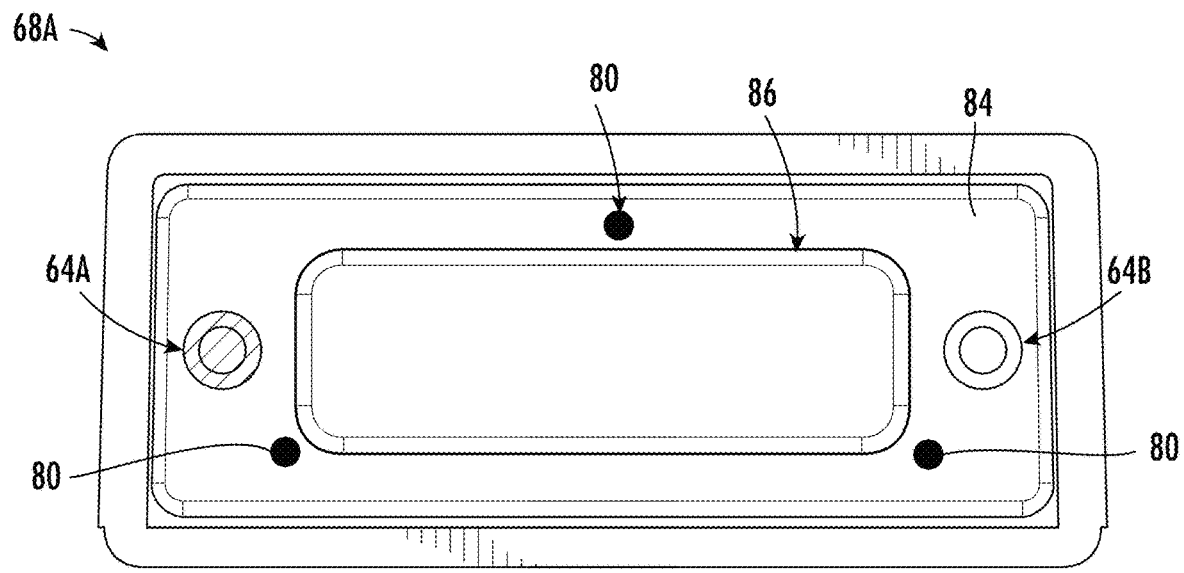
FIG. 19A is a front view of a glass sheet to be applied onto a ferrule end face.
Figure 19B:
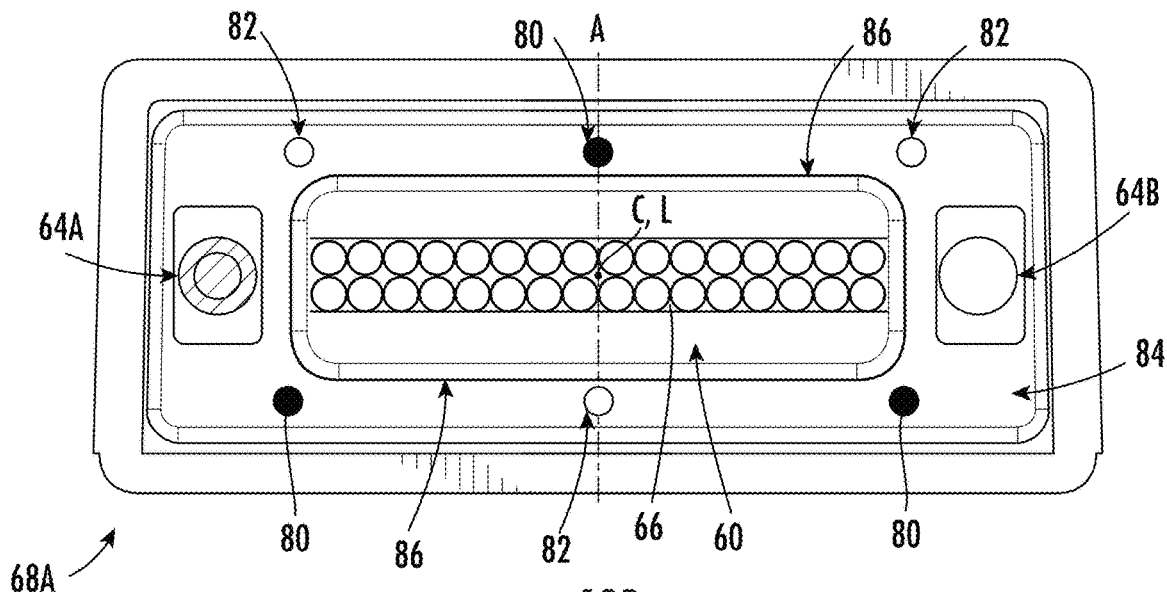
FIG. 19B is a front view of an alternate ferrule end face of the lensed connector ferrule of FIG. 3 with the glass sheet of FIG. 19A applied onto the ferrule end face and illustrating contact points of the alternate ferrule end face when the lensed connector ferrule is coupled to another lensed connector ferrule.

FIGS. 19A and 19B are substantially the same embodiment as described in FIGS. 17A, 17B, and 18 except as noted below. As shown, in comparison to FIGS. 17A, 17B, and 18, glass sheet 84 spans a greater portion of first ferrule end face 62A where microbores 60 are uncovered. In some embodiments, first contact surface 68A (or glass sheet 84) comprises between 55% and 100%, between 60% and 90%, or between 65% and 85% of a surface area of first ferrule end face 62A.

Figure 20A:
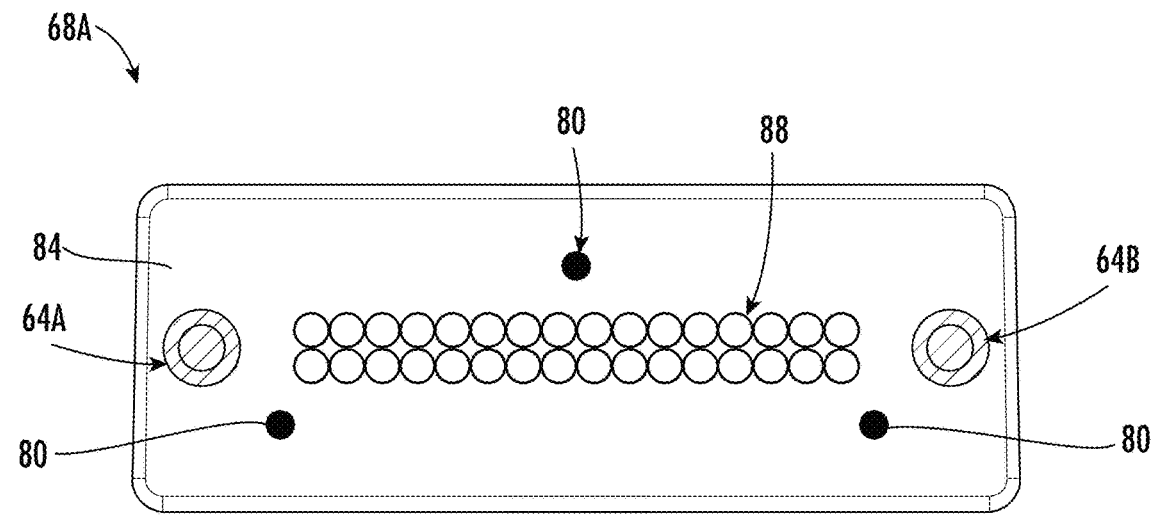
FIG. 20A is a front view of an alternate glass sheet to be applied onto a ferrule end face.
Figure 20B:
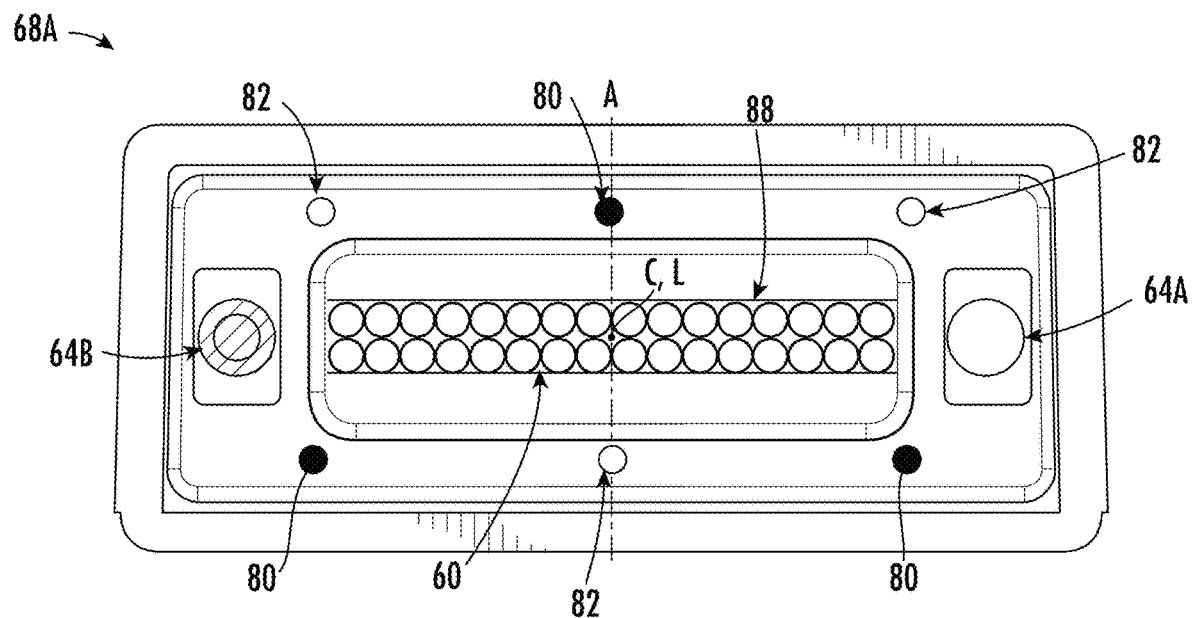
FIG. 20B is a front view of an alternate ferrule end face of the lensed connector ferrule of FIG. 3 with the glass sheet of FIG. 20A applied onto the ferrule end face and illustrating contact points of the alternate ferrule end face when the lensed connector ferrule is coupled to another lensed connector ferrule.

FIGS. 20A and 20B are substantially the same embodiment as described in FIGS. 17A, 17B, 18, 19A, and 19B except as noted below. As shown, in comparison to FIGS. 17A, 17B, 18, 19A, and 19B, glass sheet 84 spans substantially entirely first ferrule end face 62A where lenses 88 are integrally formed with glass sheet 84 to be received into microbores 60 (i.e., only apertures 90 are provided to align with alignment pin holes 64A, 64B). In some embodiments, first contact surface 68A (or glass sheet 84) comprises about 100% of a surface area of first ferrule end face 62A. In some embodiments, lenses 88 can be formed in glass sheet 84 using a variety of processes, such as glass swelling, laser bump processing, or photolithographic etch processing, using gray-scale or binary optic lenses. In some embodiments, lenses 88 can also be formed on the surface of the glass substrate, by applying additional lens material and then selectively removing or shaping it using molding, pressing, etching, or machining processes. In this embodiment, bumps 80 are at least twice the height of lenses 88 to ensure that lenses 88 of ferrule 22A do not contact lenses 88 of second ferrule 22B.

Referring to FIG. 21, an alternate ferrule end face 62A of first ferrule 22A is shown. As shown, ferrule end face 62A includes a first contact surface 68A that comprises a plurality of ribs 78 that are spaced apart and a gasket 92. Ribs 78 are angled with respect to a plane defined by axis A that includes center C of ferrule end face 62A. In some embodiments, ribs 78 have an angle ranging between 0° and 90°. Ribs 78 of first contact surface 68A are integrally formed with first ferrule end face 62A and are configured to contact ribs 78 of second contact surface 68B of second ferrule 22B as discussed below. Gasket 92 is positioned between alignment pin holes 64A, 64B and microbores 60 to prevent dust and debris from entering the lens array recessed cavity during connector deployment. In particular, gasket 92 is positioned around microbores 60 as shown. In some embodiments, gasket 92 is fabricated from a material that can deform when contacting a mating gasket during connector ferrule mating. In some embodiments, gasket 92 is attached to first ferrule end face 62A using a pressure sensitive adhesive. In some embodiments, gasket 92 has a thickness such that when a compression force is applied to mated connector ferrules 22A, 22B, gasket 92 compresses and other portions of ferrule end face 62A (e.g., ribs 78) to make contact with corresponding portions of second ferrule 22B. In some embodiments, first contact surface 68A comprises between 1% and 30%, between 5% and 25%, or between 5% and 30% of a surface area of first ferrule end face 62A.

When coupling ferrule 22A to second ferrule 22B, second ferrule 22B is rotated 180 degrees about a longitudinal axis L that extends through center C, and there is overlap or contact between ribs 78 of first contact surface 68A and ribs 78 of second contact surface 68B and between gasket 92 of first contact surface 68A and gasket 92 of second contact surface 68B to define a contact area 70. In some embodiments, contact area 70 comprises less than 1% of a total surface area of first ferrule end face 62A and second ferrule end face 62B.

Figure 22A:
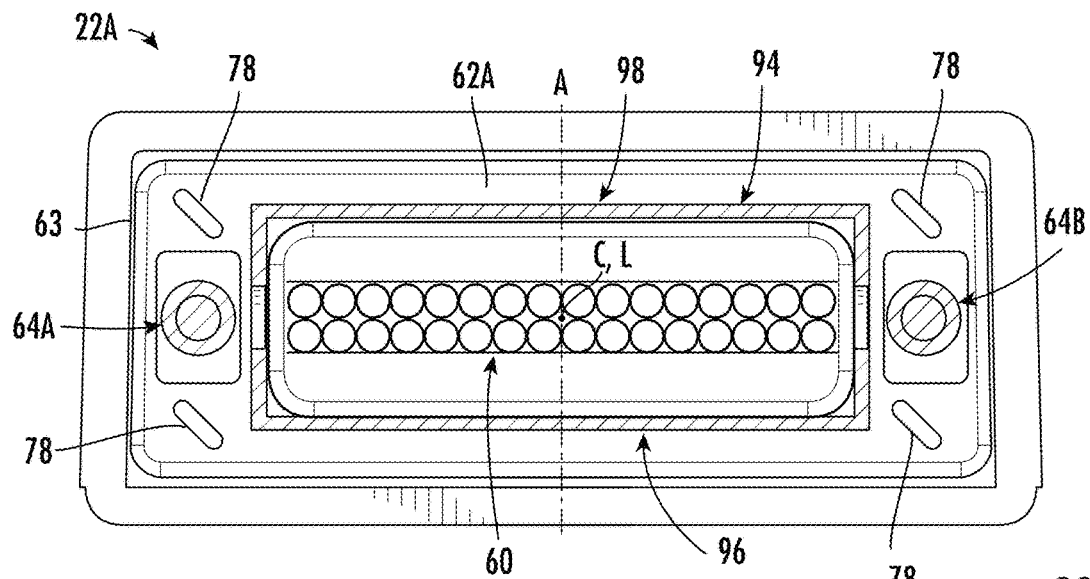
FIG. 22A is a front view of an alternate ferrule end face of the lensed connector ferrule of FIG. 3.
Figure 22B:
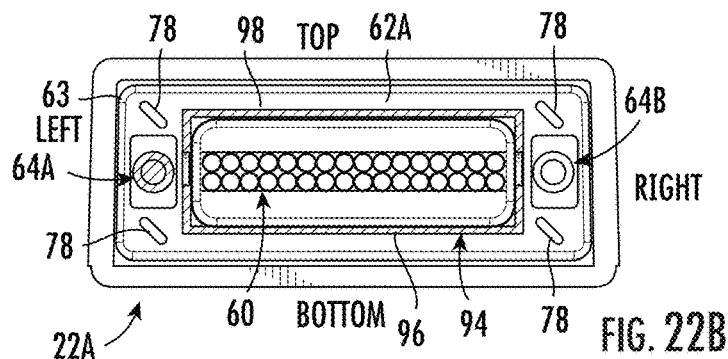
FIGS. 22B and 22C are front views of lensed connector ferrules of FIG. 22A that are configured to couple to each other.
Figure 22C:
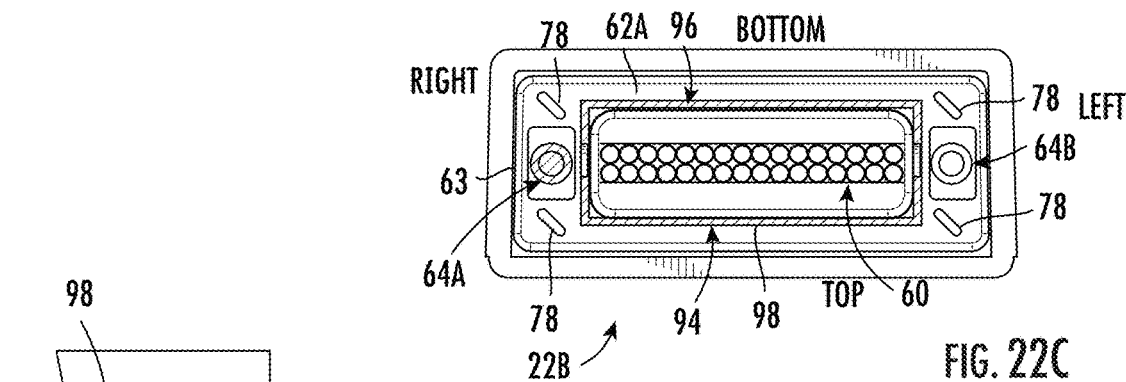
Figure 22D:
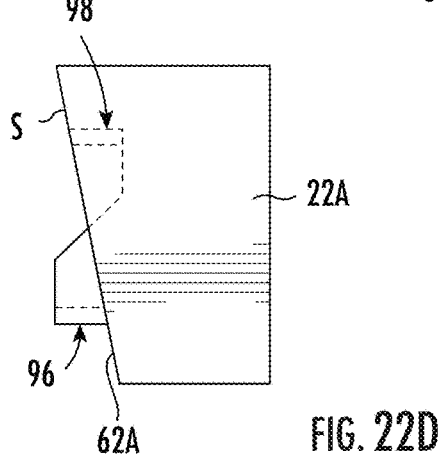
FIG. 22D is a side view of the lensed connector of FIG. 22A.

Referring now to FIGS. 22A-22D and 23A-23B, an alternate ferrule end face 62A of first ferrule 22A is shown. As shown, ferrule end face 62A includes a first contact surface 68A that comprises a plurality of ribs 78 that are spaced apart and a ridge-trench ring 94. Ribs 78 are angled with respect to a plane defined by axis A that includes center C of ferrule end face 62A. In some embodiments, ribs 78 have an angle ranging between 0° and 90°. Ribs 78 of first contact surface 68A are integrally formed with ferrule end face 62A and are configured to contact ribs 78 of second contact surface 68B of second ferrule 22B as discussed below. Ridge-trench ring 94 comprises a ring or other polygonal shape that surrounds microbores 60. As shown, a portion of ridge-trench ring 94 comprises a ridge 96, and a portion of ridge-trench ring 94 comprises a trench 98 where ridge 96 and trench 98 are continuous with each other to form ridge-trench ring 94. Ridge 96 extends from first ferrule end face 62A as shown in FIG. 22D. In some embodiments, ridge 96 has a height extending from a surface S of first ferrule end face 62A that ranges between 10 μm and 1.9 mm, between 40 μm and 0.9 mm, or between 90 μm and 400 μm. As used herein, "ridge" refers to a structure integrally formed with contact surface 68 that is elevated from surface S of ferrule end face 62.

Figure 23A:
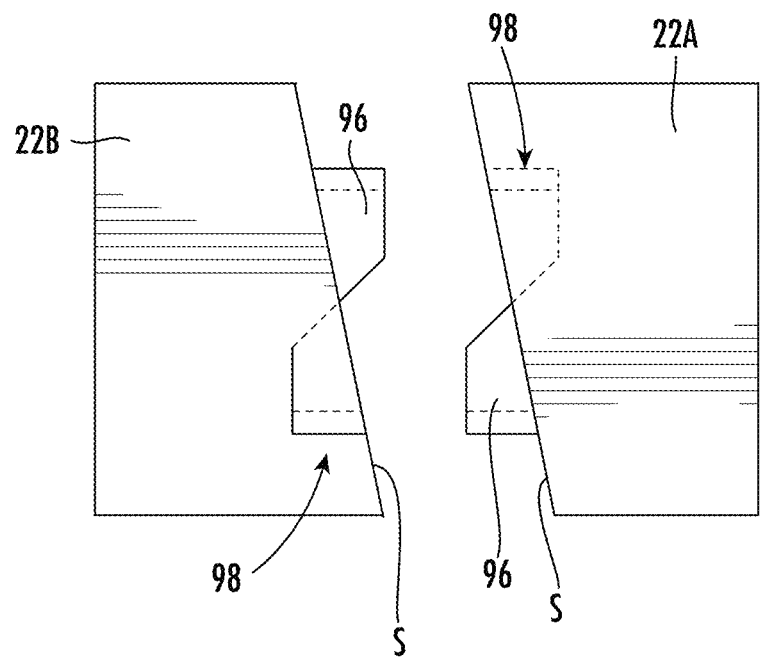
FIGS. 23A and 23B are side views of lensed connector ferrules of FIGS. 22B and 22C illustrating how the lensed connector ferrules are coupled to each other.
Figure 23B:
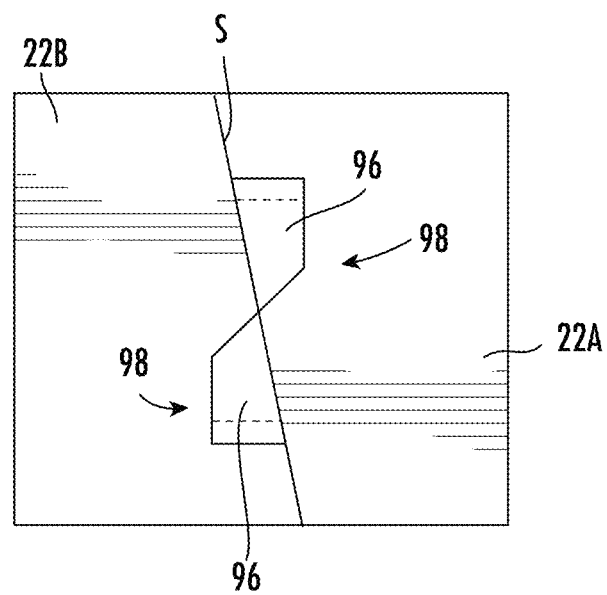

Trench 98 extends inwardly from first ferrule end face 62A to form a recess as shown in FIG. 22D. Trench 98 is configured to receive ridge 96 when coupling first ferrule 22A and second ferrule 22B as shown in FIG. 23B and discussed below. That is, in some embodiments, trench 98 has a depth extending from a surface S of first ferrule end face 62A that is substantially the same as the height of ridge 96. In some embodiments, trench 98 has a depth that ranges between 20 μm and 2 mm, between 50 μm and 1 mm, or between 100 μm and 500 μm. In some embodiments, ridge 96 and trench 98 each comprise about 50% of ridge-trench ring 94. However, it is within the scope of the present disclosure that alternate suitable percentages of ridge 96 and trench 98 may be used. In some embodiments, first contact surface 68A comprises between less than 1% and 10%, between less than 1% and 7.5%, or between less than 1% and 5% of a surface area of first ferrule end face 62A. As used herein, "trench" refers to a recess in contact surface 68 that extends inwardly from surface S of ferrule end face 62.

When coupling ferrule 22A to second ferrule 22B, second ferrule 22B is rotated 180 degrees about a longitudinal axis L that extends through center C, and there is overlap or contact between ribs 78 of first contact surface 68A and ribs 78 of second contact surface 68B and between ridge-trench ring 94 of first contact surface 68A and ridge-trench ring 94 of second contact surface 68B to define a contact area 70. In particular, referring to FIGS. 23A and 23B, ridge-trench ring 94 of first ferrule 22A is moved along direction D1 such that ridge 96 and trench 98 are received in corresponding trench 98 and ridge 96 of second ferrule 22B as shown in FIG. 23B. It is within the scope of the present disclosure that second ferrule 22B can be moved towards first ferrule 22A to couple corresponding ridges 96 and trenches 98 when coupling first ferrule 22A and second ferrule 22B together. In some embodiments, contact area 70 comprises less than 1% of a total surface area of first ferrule end face 62A and second ferrule end face 62B.

Figure 24A:
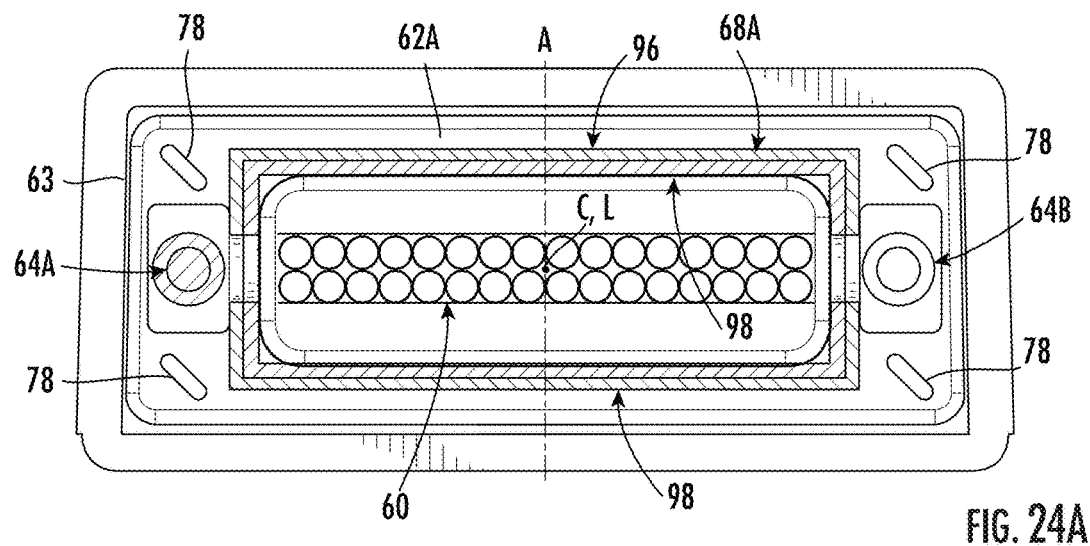
FIG. 24A is a front view of an alternate ferrule end face of the lensed connector ferrule of FIG. 3.
Figure 24B:
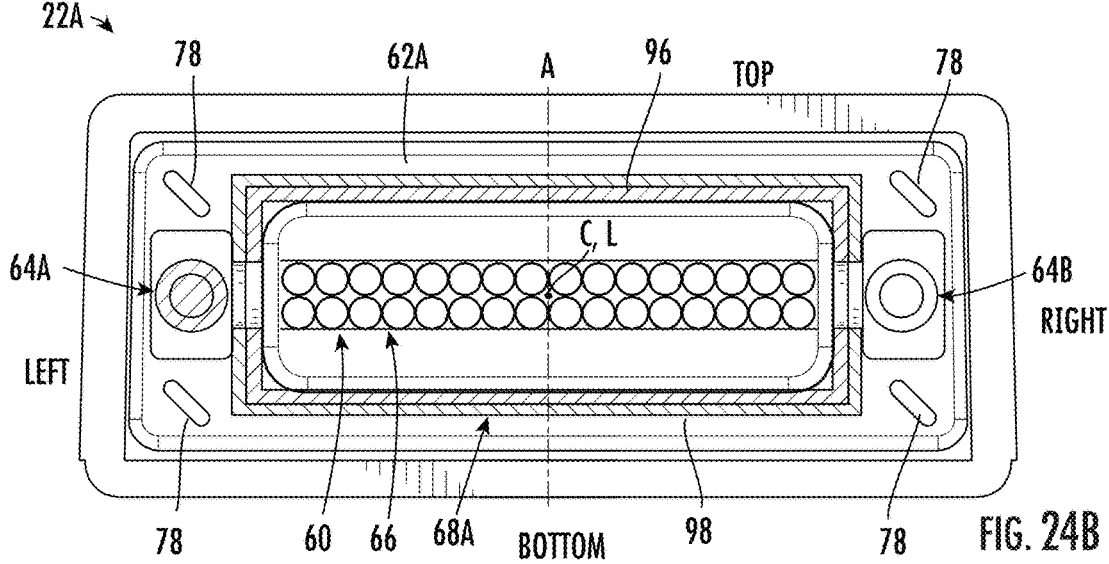
FIGS. 24B and 24C are front views of lensed connector ferrules of FIG. 24A that are configured to couple to each other.
Figure 24C:
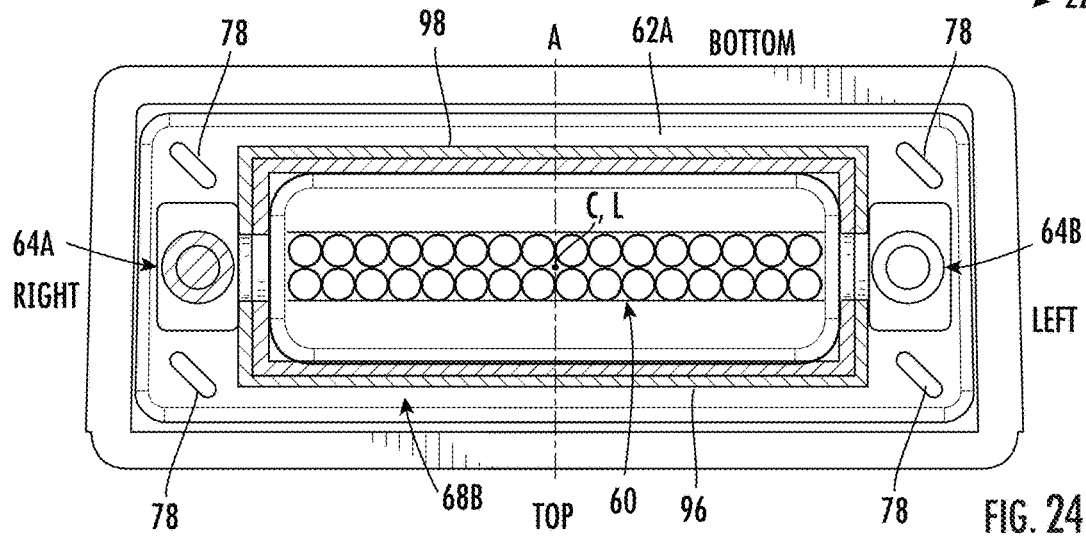

FIGS. 24A-24C are substantially the same embodiment as shown in FIGS. 22A-22D and 23A-23B except as noted below. As shown in FIG. 24A, a plurality of ridge-trench rings 94 are provided. In particular, in this embodiment, a first inner ridge-trench ring 94 and a second outer ridge-trench ring 94 are shown where first inner ridge-trench ring 94 and second outer ridge-trench ring 94 are concentric with a center C of first ferrule end face 62A. However, it is within the scope of the present disclosure that additional ridge-trench rings 94 may be added onto first ferrule end face 62A. Also, as shown, ridge 96 of first inner ridge-trench ring 94 is adjacent to trench 98 of second outer ridge-trench ring 94. Similarly, trench 98 of first inner ridge-trench ring 94 is adjacent to ridge 96 of second outer ridge-trench ring 94. However, it is within the scope of the present disclosure that in alternate embodiments, ridges 96 of first inner ridge-trench ring 94 and second outer ridge-trench ring 94 are adjacent to each other, and trenches 98 of first inner ridge-trench ring 94 and second outer ridge-trench ring 94 are adjacent to each other.

The embodiments of the present disclosure described above provide reduced contact areas 70 between ferrules 22A, 22B when ferrules 22A, 22B are coupled to each other. The advantage of reducing contact area 70 is that, for a constant axial compression force applied during connector ferrule mating, reduced contact area 70 increases the pressure applied on contact area 70. This increased pressure increases the likelihood that dust or debris trapped in contact area 70 during connector ferrule mating will be compressed, reducing the potential for angular misalignment of coupled expanded beams.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A lensed connector comprising:
a first lensed connector ferrule comprising a first ferrule end face;
wherein the first lensed connector ferrule has a first contact surface comprising a portion of a first surface area of the first ferrule end face, the first contact surface comprising between 1% and 50% of the first surface area;
wherein the first contact surface comprises a contact ring, wherein the contact ring includes a plurality of raised surfaces, wherein the plurality of raised surfaces are elevated relative to the first contact surface, the plurality of raised surfaces are spaced apart such that a plurality of trenches are between the plurality of ridges.

2. The lensed connector of claim 1, wherein the plurality of raised surfaces are integrally formed with the first ferrule end face.

3. The lensed connector of claim 1, wherein the plurality of raised surfaces are elevated relative to the first contact surface and angled relative to a plane defined by a central axis of the first lensed connector ferrule.

4. The lensed connector of claim 1, further comprising a second lensed connector ferrule coupled to the first lensed connector ferrule, the second lensed connector ferrule having a second ferrule end face;
wherein the second lensed connector ferrule has a second contact surface comprising between 1% and 50% of a second surface area of the second ferrule end face;
wherein the first lensed connector ferrule and the second lensed connector ferrule are coupled to each other such that a first portion of the first contact surface and a second portion of the second contact surface contact each other to define a contact area;
wherein the contact area comprises between less than 1% and 10% of a total surface area, wherein the total surface area is the sum of the first surface area and the second surface area.

5. A lensed connector assembly comprising:
a first lensed connector ferrule comprising a first ferrule end face;
wherein the first lensed connector ferrule has a first contact surface comprising a portion of a first surface area of the first ferrule end face, the first contact surface comprising between 1% and 50% of the first surface area;
a second lensed connector ferrule comprising a second ferrule end face, the second lensed connector coupled to the first lensed connector, wherein the second ferrule end face has the same configuration as the first ferrule end face but is oriented 180 degrees relative to the first ferrule end face when coupled to the first ferrule end face;
wherein the second lensed connector ferrule has a second contact surface comprising a portion of a second surface area of the second ferrule end face, the second contact surface comprising between 1% and 50% of the second surface area;
wherein the first lensed connector ferrule is coupled to the second lensed connector ferrule to define a contact area where the first contact surface contacts the second contact surface, the contact area comprises between less than 1% and 10% of a total surface area, and the total surface area is the sum of the first surface area and the second surface area;
wherein the first contact surface comprises a plurality of raised surfaces that are elevated relative to the first contact surface and angled relative to a plane defined by a central axis of the first lensed connector ferrule, wherein the plurality of raised surfaces are parallel to each other.

6. The lensed connector assembly of claim 5, wherein the plurality of raised surfaces are integrally formed with the first ferrule end face.

7. The lensed connector assembly of claim 5, wherein the plurality of raised surfaces are elevated relative to the first contact surface, the plurality of raised surfaces are spaced apart such that a plurality of trenches are between the plurality of ridges.

8. A lensed connector comprising:
a first lensed connector ferrule comprising a first ferrule end face;
wherein the first lensed connector ferrule has a first contact surface comprising a portion of a first surface area of the first ferrule end face, the first contact surface comprising between 1% and 50% of the first surface area;
wherein the first contact surface comprises a plurality of ridges that are elevated relative to the first contact surface and angled relative to a plane defined by a central axis of the first lensed connector ferrule, wherein the plurality of ridges are parallel to each other.

9. The lensed connector of claim 8, wherein the first contact surface comprises at least one raised surface integrally formed with the first ferrule end face.

10. The lensed connector of claim 8, wherein the first contact surface comprises a plurality of ridges that are elevated relative to the first contact surface and angled relative to a plane defined by a central axis of the first lensed connector ferrule, wherein the plurality of ridges are parallel to each other.

11. The lensed connector of claim 8, further comprising a second lensed connector ferrule coupled to the first lensed connector ferrule, the second lensed connector ferrule having a second ferrule end face;
- wherein the second lensed connector ferrule has a second contact surface comprising between 1% and 50% of a second surface area of the second ferrule end face;
- wherein the first lensed connector ferrule and the second lensed connector ferrule are coupled to each other such that a first portion of the first contact surface and a second portion of the second contact surface contact each other to define a contact area;
- wherein the contact area comprises between less than 1% and 10% of a total surface area, wherein the total surface area is the sum of the first surface area and the second surface area.

\* \* \* \* \*